United States Patent
Kiyomizu et al.

(10) Patent No.: US 8,811,689 B2
(45) Date of Patent: Aug. 19, 2014

(54) FINGER VEIN AUTHENTICATION DEVICE

(75) Inventors: Harumi Kiyomizu, Inagi (JP); Naoto Miura, Kokubunji (JP); Takafumi Miyatake, Hachioji (JP); Akio Nagasaka, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/442,050

(22) Filed: Apr. 9, 2012

(65) Prior Publication Data

US 2012/0195477 A1 Aug. 2, 2012

Related U.S. Application Data

(63) Continuation of application No. 12/540,506, filed on Aug. 13, 2009, now Pat. No. 8,155,402.

(30) Foreign Application Priority Data

Oct. 17, 2008 (JP) ................................ 2008-268750

(51) Int. Cl.
*G06K 9/00* (2006.01)
(52) U.S. Cl.
USPC .......................................... 382/124; 382/115
(58) Field of Classification Search
USPC .................................. 382/115, 124
See application file for complete search history.

(56) References Cited

U.S. PATENT DOCUMENTS

| | | | |
|---|---|---|---|
| 8,223,199 B2 * | 7/2012 | Kiyomizu et al. ............. 348/77 |
| 2003/0016345 A1 | 1/2003 | Nagasaka et al. | |
| 2004/0184641 A1 | 9/2004 | Nagasaka et al. | |
| 2007/0058841 A1 | 3/2007 | Miura et al. | |
| 2007/0177767 A1 | 8/2007 | Miura et al. | |
| 2008/0152195 A1* | 6/2008 | Nagasaka et al. ............. 382/115 |
| 2008/0175444 A1 | 7/2008 | Maro et al. | |
| 2010/0142771 A1 | 6/2010 | Miura et al. | |

FOREIGN PATENT DOCUMENTS

| | | |
|---|---|---|
| DE | 44 21 237 | 12/1994 |
| JP | 07-021373 | 1/1995 |
| JP | 2000-222123 | 8/2000 |
| JP | 2004-070943 | 3/2004 |
| JP | 2004-265269 | 9/2004 |
| JP | 2005-025414 | 1/2005 |
| JP | 2005-071118 | 3/2005 |
| JP | 2006-139415 | 6/2006 |
| JP | 2006-331441 | 12/2006 |

(Continued)

OTHER PUBLICATIONS

Japanese Office Action for Japanese patent application No. 2008-268750, date of mailing: Aug. 7, 2012.

*Primary Examiner* — Vikkram Bali
(74) *Attorney, Agent, or Firm* — Antonelli, Terry, Stout & Kraus, LLP.

(57) ABSTRACT

An authentication device including: a finger presenting unit to which a finger to be authenticated is presented; an opening formed on the finger presenting unit; a light source that irradiates light onto the finger; an image capture unit that captures a picture including a vein of the finger, by the light; and a finger placement table capable of placing a finger thereon, except the finger to be authenticated, wherein the finger placement table has a surface, a height of which is higher than the finger presenting unit, wherein the light source is placed inside the finger placement table, and wherein the finger placement table has a sidewall having a window that is used to allow an irradiation axis of the light from the light source upon the image capture unit.

19 Claims, 28 Drawing Sheets

(56) References Cited

FOREIGN PATENT DOCUMENTS

| JP | 2008-129995 | 6/2008 |
| JP | 2008-181570 | 8/2008 |
| JP | 2009-003492 | 1/2009 |
| JP | 2009-009354 | 1/2009 |
| JP | 2009-110132 | 5/2009 |

* cited by examiner

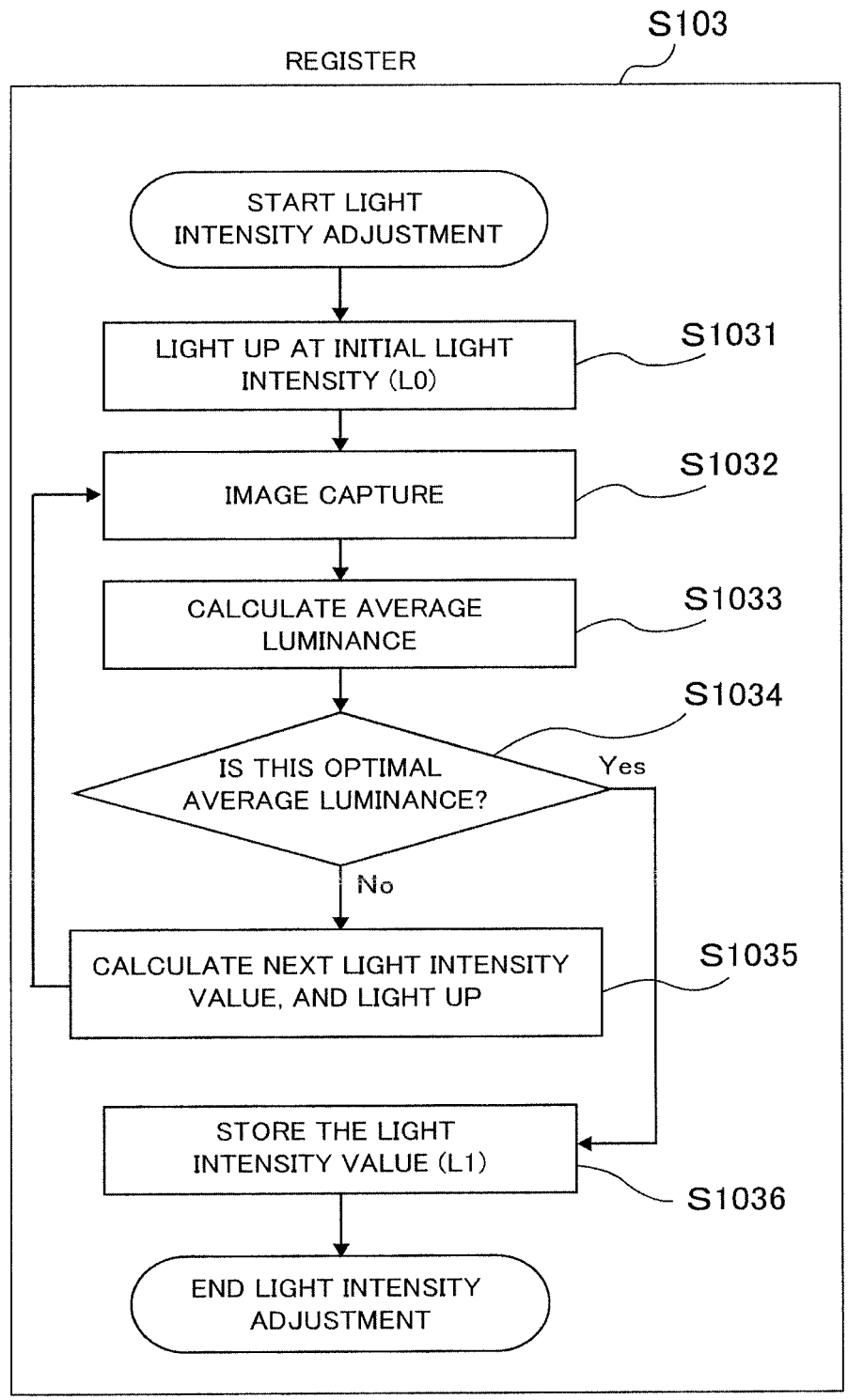

FINGER VEIN AUTHENTICATION DEVICE

CROSS REFERENCE TO RELATED APPLICATION

This is a continuation of U.S. application Ser. No. 12/540,506, filed Aug. 13, 2009 now U.S. Pat. No. 8,155,402. This application relates to and claims priority from Japanese Patent Application No. 2008-268750, filed on Oct. 17, 2008. The entirety of the contents and subject matter of all of the above is incorporated herein by reference.

BACKGROUND OF THE INVENTION

The present invention relates to an individual authentication device, and relates in particular to technology for utilizing vein patterns obtained by capturing an image of light that passed through the body.

The security of personal information has become viewed as in issue of major importance in recent years. Biometrics authentication has become the focus of much attention as a personal authentication technology for safeguarding security. Biometrics is authentication technology that utilizes the biological information of humans, and is excellent in terms of both convenience and security.

Biometrics authentication technology known in the related art performs authentication by utilizing fingerprints, the iris (of the eye), the voice, the face, veins in the back of the hand or finger veins. Among these examples of the related art, the technology disclosed in Japanese Patent Application Laid-Open Publication No. 2004-265269 for biometrics authentication by using the veins, provides excellent protection against falsification because internal biological information is utilized.

The following description describes in particular a finger vein authentication device. The finger vein authentication device irradiates infrared light onto a finger. After scattering inside the finger, the infrared light passes outside the finger. The finger vein authentication device then captures an image of the infrared light that passed through to the palm side of the finger. The hemoglobin in the blood fluid at this time absorbs the infrared light more than the surrounding tissue. The blood vessels (finger veins) distributed under the skin on the palm side of the finger are therefore visible as a dark shadow pattern (finger vein pattern) in the image captured by the finger vein authentication device. The unique features of this finger vein pattern are registered advance, and the finger vein authentication device then authenticates an individual by finding the correlation between the finger vein pattern presented by the user during authentication, with the pre-registered (finger vein pattern) special features.

A finger vein authentication device of this type that is known in the related art is disclosed in Japanese Patent Application Laid-Open Publication No. 2004-265269. This finger vein authentication device captures an image of the finger veins by irradiating infrared light on the finger from the left and right sides. A method for making the finger vein authentication device compact moreover is disclosed in Japanese Patent Application Laid-Open Publication No. 2008-181570 as a device with a narrow imaging range, and the light source installed on the side below the finger.

BRIEF SUMMARY OF THE INVENTION

In the device with a narrow imaging range described in Japanese Patent Application Laid-Open Publication No. 2008-181570, if the finger deviates from the placement position, the device sometimes mistakenly identifies the user as another person even if that user is the correct individual. Moreover, pressing the fingertips strongly might destroy the blood vessel pattern and so sometimes prevent obtaining the correct authentication results. In devices with a narrow image capture range, a device with a structure capable of stabilizing the finger submitted for authentication and a device structure that prevents pressing the finger are required in order to boost authentication accuracy. In the method for irradiating light from the left and right sides of the finger as disclosed in Japanese Patent Application Laid-Open Publication No. 2004-265269, adverse effects sometimes occurred such as being unable to capture a sharp vein image due to fingers other than the authentication finger blocking the light source, and light reflecting from fingers other than the authentication finger.

The compact finger vein authentication devices of the related art failed to consider a device structure for stabilizing the finger submitted for authentication, and the adverse effects from the other fingers not for authentication.

The finger vein authentication device of this invention contains a structure for stabilizing the finger and is moreover capable of providing a compact and highly accurate finger vein authentication device by preventing adverse effects from the left and right fingers.

An aspect representative of this invention is described as follows.

A finger vein identification device contains: a case for placing the finger; a light source for irradiating infrared light onto the finger; a light intensity control means for controlling the light intensity of the light source; an image capture unit for capturing an image of the finger veins by way of light from a light source; an aperture to open in the image capture direction of the image capture unit; and a storage device to store the finger biological information; and an image calculation unit to extract the features from the image captured by the image capture unit and match the features with the biological information stored in the storage device, and a finger stand for placing the fingers on the left and right of the authentication finger. The finger stand for the left and right fingers is moreover made from a light blocking member.

The present invention boosts the reproducibility of the submitted finger. A compact and highly accurate finger vein authentication device is also achieved by preventing deterioration in the authentication accuracy caused by the fingers on the left and right of the finger for authentication.

BRIEF DESCRIPTION OF THE DRAWINGS

FIGS. 6A and 6B are flow charts for describing the high-speed method for the light adjustment process in the second embodiment;

DETAILED DESCRIPTION OF THE INVENTION

Figure 1A:
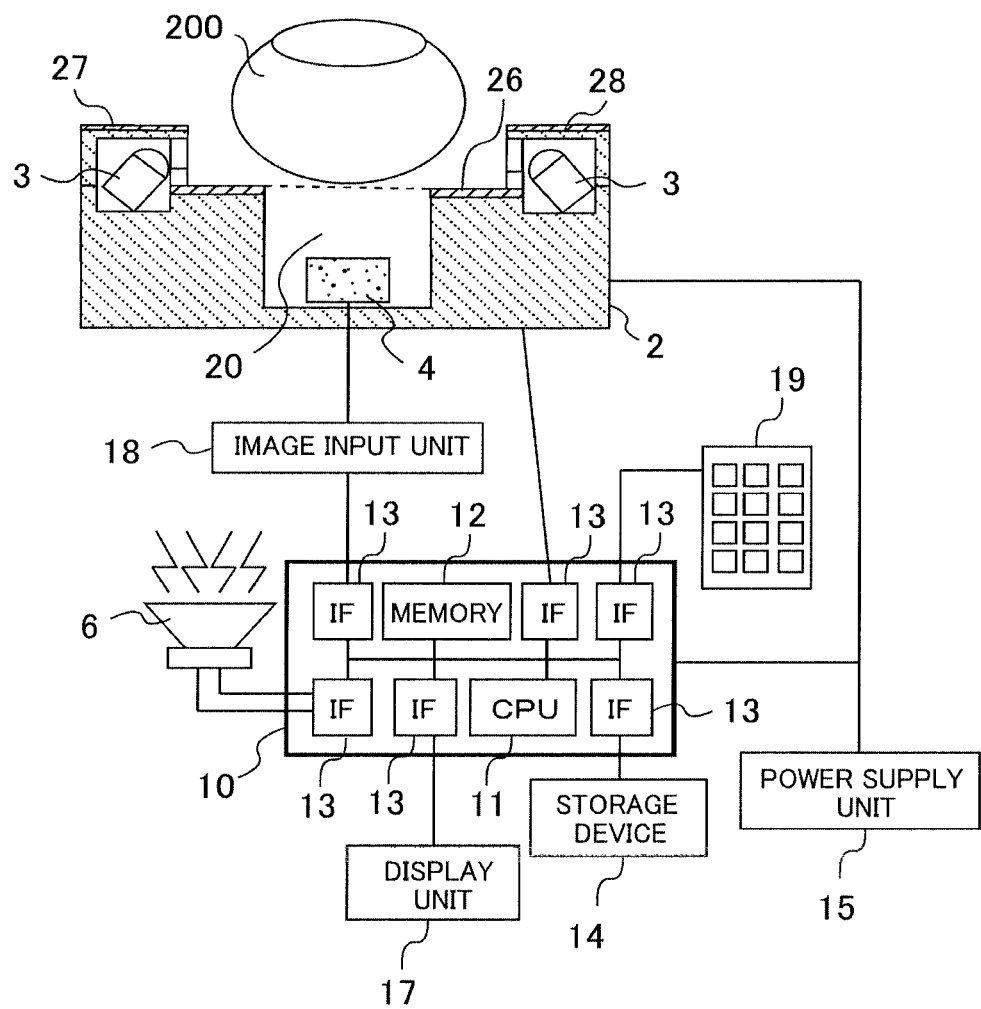
FIGS. 1A and 1B are block diagrams of the finger vein authentication device of the first embodiment of this invention.

The embodiments of this invention are described next while referring to the drawings.

First Embodiment

Figure 1B:
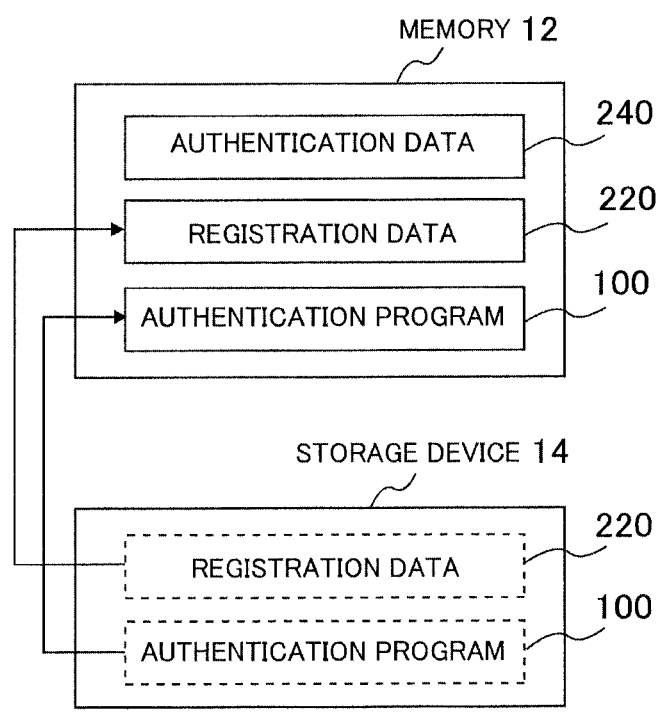

FIG. 1A is a block diagram of the authentication device of the first embodiment. FIG. 1B is a drawing showing the internal sections of the memory 12 and the storage device 14 serving as the storage unit within the authentication system of the first embodiment.

This authentication system (device) includes: a finger vein data acquisition device 2, an image input unit 18, an authentication processor unit 10, a storage device 14, a display unit 17, an information input unit 19, an audio output unit 6 and a power supply unit 15.

The finger vein data acquisition device 2 is one case, and contains a light source 3, an image capture device 4, a center finger stand 26, a left finger stand 27, and a right finger stand 28. The light source 3 is for example an infrared ray emitting diode (Light Emitting Diode: LED). The light source 3 emits infrared light onto a finger 200 placed on the center finger stand 200. The image capture unit 4 captures an image of the mounted finger 200.

The image input unit 18 inputs the image captured by the image capture unit 4 into the authentication processor unit 10 functioning as the processor unit.

The authentication processor unit 10 includes a central processing unit (CPU) 11, a memory 12, various interfaces (IF) 13. The CPU 11 performs various types of processing by executing the authentication program 100 stored in the memory 12. The memory 12 temporarily stores (or buffers) the authentication program 100 executed by the CPU 11. The memory 12 also stores the images input by the image input unit 18. The interface 13 is connects to external devices for the authentication processor unit 10. More specifically, the interface 13 connects to the finger vein data acquisition device 2, the storage device 14, the display unit 17, the information input unit 19, the audio output unit 6, and the image input unit 18, etc.

The storage device 14 stores the user registration data 220 and the authentication program 100 in advance. The registration data 220 as shown in FIG. 1B is information for matching to the user, and for example is image information for finger vein patterns. The image of the finger vein pattern is an image captured as a dark shadow pattern of the blood vessels (finger veins) distributed beneath the skin on the palm side of the finger.

The display unit 17 is for example a liquid crystal display, and displays information received from the authentication processor unit 10. The information input unit 19 is for example a keyboard, and sends the information input by the user to the authentication processor unit 10. The audio output unit 6 is a speaker, and generates audio from the information received from the authentication processor unit 10. The power supply unit 15 is a dry cell or an external power supply. The power supply unit 15 supplies electrical power to drive the finger vein data acquisition device 2 and the authentication processor unit 10.

In this authentication system, infrared light from the light source 3 irradiates onto the finger 200 when the user presents the finger 200 to the finger vein data acquisition device 2. The light scatters internally in the finger 200 and the light transmitted through the finger 200 is input to the image capture unit 4. The image capture unit 4 converts the light that was input into electrical signals and loads these signals into the authentication processor unit 10 as images. The loaded images are stored in the memory 12. The registration data 220 and the authentication program 100 stored in the storage device 14 are also stored into the memory 12 (FIG. 1B) from the storage device 14. The CPU 11 generates authentication data 240 from the image that was input, according to the authentication program 100 stored in the memory 12, and matches it with the registration data 220. This collation (or matching) process calculates the correlations between the two data being compared and decides according to those values if there is a match with the registered data. Those decision results are utilized to authenticate the individual. The authentication results are displayed on the display unit 17, or are announced by voice from the audio output unit 6.

FIG. 2 is drawings showing external views of the finger vein data acquisition device 2 of the first embodiment. FIG. 2A is an upper view of the device 2. FIG. 2B is an upper view of the device 2 when the finger is mounted. FIG. 2C is a cross sectional view taken along lines A-A of FIG. 2B. FIG. 2D is a cross sectional view taken along lines B-B of FIG. 2B.

A center finger stand 26 for the user to submit the finger for authentication is installed on the upper side of the device 2. An aperture 20 is formed on the center finger stand 26. An infrared filter 24 is installed so as to cover the aperture 20. The infrared filter 24 prevents unwanted light other than infrared light from intruding into the device. The infrared filter 24 also prevents foreign matter such as dust and debris from intruding into the device. The filter 24 is installed at a position several millimeters lower than the center finger stand 26 and set so the filter does not contact the finger 200. This placement prevents the blood vessel (vein) pattern from disappearing or deforming due to pressing the finger. Dirt is also prevented from adhering to the filter 24. An image capture unit 4 is installed directly beneath the aperture 20.

Placing the finger 200 causes infrared light from the light source 3 made up of multiple light source devices to irradiate onto the finger 200. That light scatters in all direction after reaching the interior of the finger. A portion of the light that scattered inside the finger reaches the upper vicinity of the aperture 20, and a further portion of that light proceeds towards the outside of the finger. That light passes through the aperture 20 and the filter 24 and is captured by the image capture unit 4. That light passes from the interior of the finger 200 to the surface on the palm side of the finger 200 and so contains a difference in contrast between the weak light attenuated due to passing through the vein sections, and the strong light that not attenuated after passing through sections without veins. Capturing an image of this light therefore reveals a finger vein pattern image of an area section positioned directly above the aperture 20. Finger vein patterns on area sections of the finger 200 are acquired in this way.

Capturing sharp finger vein pattern images of the area section of finger 200 positioned above the aperture 20 or in other words the finger vein pattern of the section for imaging, requires satisfying the following optical conditions. First of all the image that is captured should include no reflected light irradiated from outside the finger onto the skin surface of the section for imaging; and also the image that is captured should include no scattered light that did not reach a depth where the finger veins exist. If these conditions are not satisfied then the light not containing a finger vein pattern will lower the contrast between the finger vein sections and all other body tissues. Moreover, the finger vein pattern will be hard to view since unwanted images such as wrinkles on the finger surfaces will also appear in the image. Therefore in this embodiment, the size of the aperture 20 is set smaller than the length and width of the finger 200, so when the user submits the finger 200, the finger 200 completely covers the aperture 20. The light not transmitting through the finger can in this way be prevented from directly entering into the device In devices where the aperture size is larger than the finger size such as disclosed in Japanese Patent Application Laid-Open Publication No. 2004-265269, the finger cannot cover the aperture. Outside light therefore enters in the gap between the aperture and the finger so that a drop in image quality of the finger vain image occurs. A high light blocking wall must therefore be installed to shield the periphery of the finger 200 from outside light. Even in cases where outside light can be completely blocked by a light blocking wall, the light output from the light source 3 enters in the gap between the finger and the aperture when the light source 3 is installed at a low position. A drop in image quality of the captured image then occurs due to light entering from this gap reflecting from the surfaces of the finger. So in devices with a large aperture, the light source 3 had to be installed at a high installation position in order to boost the image quality. The authentication device of this embodiment however has a small aperture size so a sharp vein image can be acquired under outside light even without installing a high light blocking wall. Moreover the installation position of the light source 3 can be lowered. The device can therefore be made thinner. Also, making the aperture 20 smaller renders the effect that the installation area (footprint) of the device can be reduced.

In devices of the related art with large size apertures, the finger was supported at the two points consisting of the fingertip side and the base side. So when the user forcefully presented his finger, the finger sometimes bent backwards and the blood vessel pattern whose image was being captured was greatly distorted. However in cases where the aperture size is smaller than the finger, beside the fingertip and base sides, the left and right edges on the palm side of the finger also make contact with the center finger stand 26. In other words, all sections of the finger make contact with the center finger stand 26 except for directly above the aperture 20 in a state where the hole is open. There is consequently a larger surface area where the finger makes contact with the finger stand so the submitted finger is stable and backward bending of the finger is prevented. In the device of this embodiment the finger stand 26 is in a level state and so is highly effective in preventing backward bending of the finger.

Figure 2A:
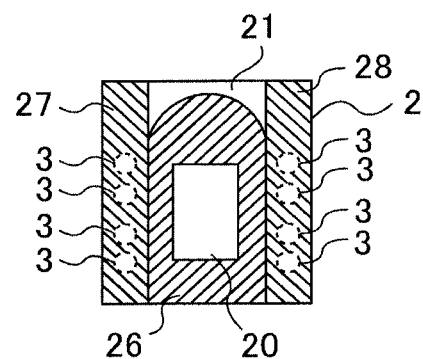
FIGS. 2A, 2B, 2C, and 2D are drawings showing the contours of the finger vein data acquisition device of the first embodiment.
Figure 2B:
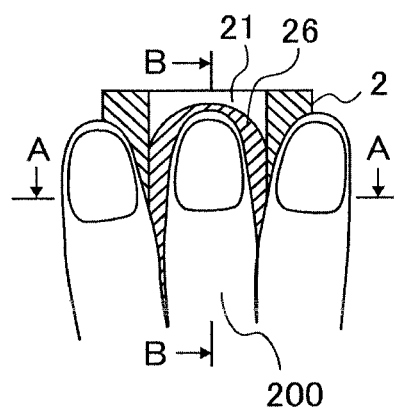
Figure 2C:
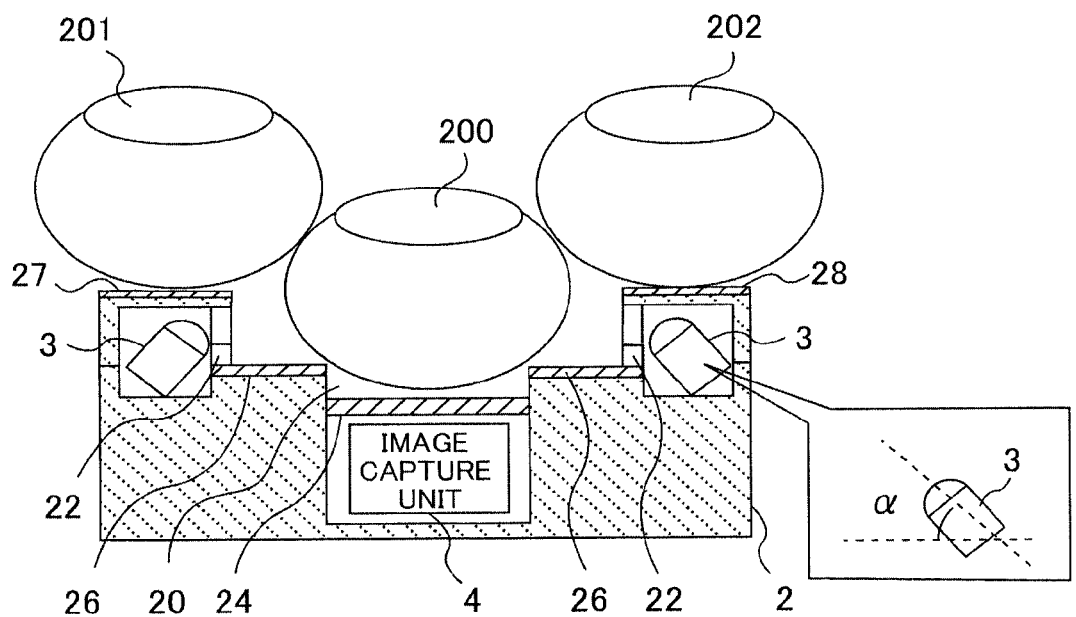
Figure 2D:
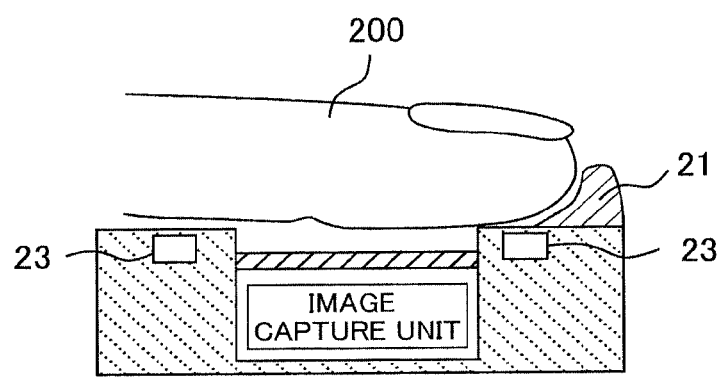

A projection 21 is formed in this device for positioning the finger 200. The user finger is submitted so that the fingertip is aligned with the projection 21 (FIG. 2D). The projection 21 prevents placing the finger 200 at a position that deviates from the specified position.

When the user finger position is aligned with the projection 21, the position of the aperture 20 allows capturing an image of the area around the first finger joint (or top joint). Image capture is possible because the skin of the finger joint section is thinner than all other sections, which makes capturing an image of the veins easy. The same effect can be obtained with a device that captures images of the area in the vicinity of the second joint. However, in equipment such as this device where positioning is performed by aligning the fingertip with cardinal point, the device must be large in order to capture images around the second joint. So in this embodiment, the area or in other words the size of the aperture 20 position whose image is captured is set as the area in the vicinity of the first joint of finger 200.

A touch sensor 23 is installed respectively on the base side and the fingertip side of the center finger stand 26. The submission of the finger by the user can in this way be detected.

An infrared light source 3 serving as the finger vein image capture light is installed in the device 2. The infrared light source 3 contains multiple light source devices such as LED. The light sources are installed at positions on the left and right sides of the finger 200. The light sources are moreover installed at a position lower than half the height of the finger. The light source installation angle $\alpha$ is further set in a range of 0 degrees$<\alpha<$90 degrees, and irradiates the light obliquely upwards. Lowering the installation position of the light source as described above also allows making the device thinner. Moreover installing the light source inclined obliquely, allows irradiating light at a high finger position so that sharp vein images can be captured. The light source installation position is preferably on the outer side from the finger 200 width. Light can in this way be irradiated onto the finger 200 upper half surface, or in other words the back (wrist side) of the finger. If the light source is installed on the inner side from the finger width, then the sharpness of the captured image will deteriorate because the light irradiates onto the lower half surface of the finger 200 or in other words the palm side of the finger.

As already described, in order to enhance the image quality in the device, it is important not to allow effects from scattered light that did not reach the depth where finger veins are present. Irradiating light onto the finger 200 to as high a position as possible is effective in preventing effects from scattered light. The light source 3 installation angle $\alpha$ is therefore set to a large value. However setting the installation angle $\alpha$ to an extremely large value will cause the light output from the light source 3 to pass above the finger 200, so that the light will completely fail to strike the finger 200. The installation angle $\alpha$ should therefore be set to as large a value as possible within a range capable of irradiating an adequate quantity of light even on users with slim fingers. The authentication device can in this way accommodate user fingers of various sizes and also capture sharp images.

When using an LED as the light source 3, a wall 22 made from light blocking member is installed between the finger 200 and the light source 3. Even if the LED itself is positioned facing obliquely upwards, the light emitted from the LED widens while advancing so that the light emitted from the LED will also advance downwards. So by concealing the lower side of the LED with the light blocking wall 22, the light advancing downwards is blocked and only the light proceeding upwards is allowed to pass. The light is in this way irradiated only to the finger high position so that the sharpness of the vein image is enhanced even further.

This device performs authentication by using finger vein data for a narrow area in the periphery of the first (top) joint of the finger as already described. So if there is a large deviation in the position where the finger is submitted during registration and during authentication then calculating correct authentication results will be impossible even when the registrant uses the authentication device. Stabilizing the position of the submitted finger is important for carrying out authentication with higher accuracy. The structure of the embodiment for resolving this issue is described next.

In this embodiment, the left and right finger stands 27, 28 are installed on both sides of the center finger stand for placement of fingers other than the authentication finger. The left and right finger stands 27, 28 are installed on the outer side and above the center finger stand 26. The upper surface of the left and right finger stands 27, 28 are a flat shape allowing easy finger placement. Providing a finger stand on the left and right sides of the finger for authentication prevents the finger for authentication from rotating because the three fingers consisting of the authentication finger and left/right fingers are clamped. Deviation of the finger position to the right or left can also be suppressed. The reproducibility of the submitted finger is therefore enhanced and a high accuracy authentication device attained. The left and right finger stands are also somewhat higher than the center finger stand. The higher placement prevents the user from strongly pressing the authentication finger 200.

The width of the left and right finger stands 27, 28 may be narrowed more than the finger width as long as the left and right fingers 201, 202 can be mounted and the above objectives attained. A more compact device can in this way be achieved. The example in FIG. 2 shows the middle (third) finger as the authentication finger 200, and the ring (fourth) finger and index finger as the left and right fingers 201, 202. In this embodiment however, other fingers may be utilized for authentication. For example, a method may be utilized where the index finger may be placed on the center finger stand 26, the center finger placed on one of the side finger mounts, and no finger placed on the finger mount on the other side. Clamping at least two fingers or more can prevent the authentication finger from rotating.

The above described left and right finger stands 27, 28 are also used jointly as a light blocking wall to prevent image quality deterioration caused by the left and right fingers 201, 202. The problem of a drop in authentication accuracy due to the left and right fingers which is a drawback of the downward irradiation method, and a device structure for resolving this problem are described next while referring to FIG. 3.

Figure 3A:
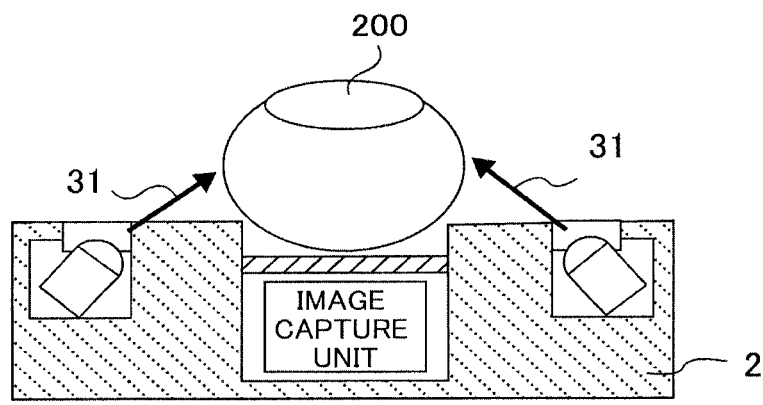
FIGS. 3A, 3B, 3C, and 3D are drawings for describing factors in image quality deterioration due to the left and right fingers, and the scheme of the first embodiment for eliminating image quality deterioration.
Figure 3B:
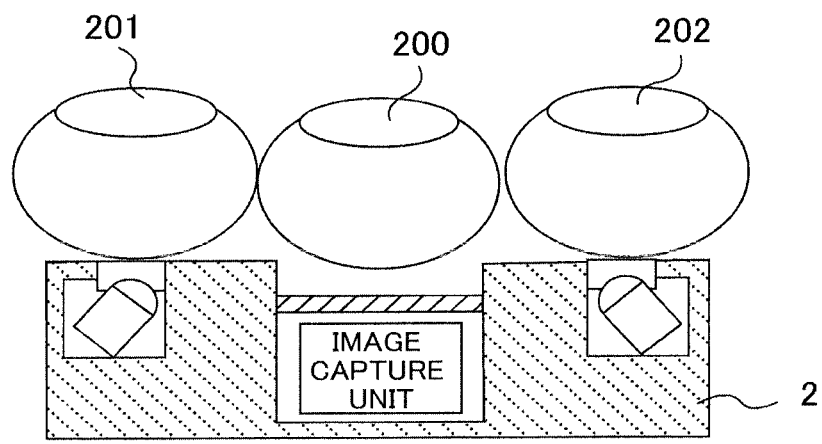
Figure 3C:
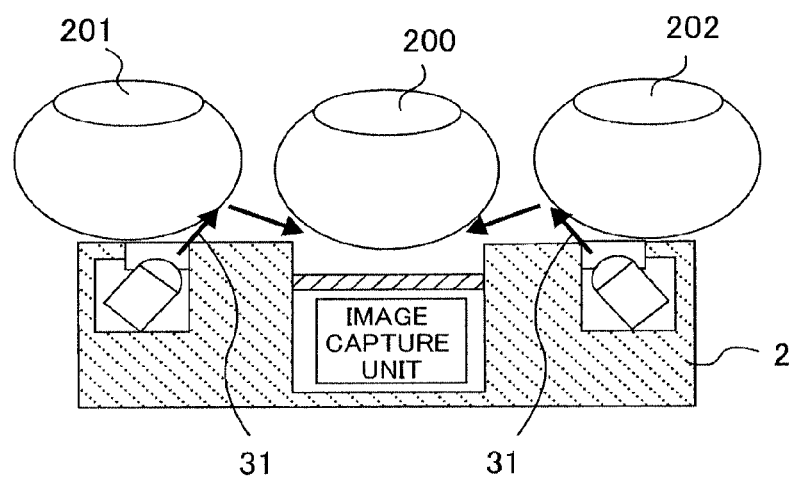
Figure 3D:
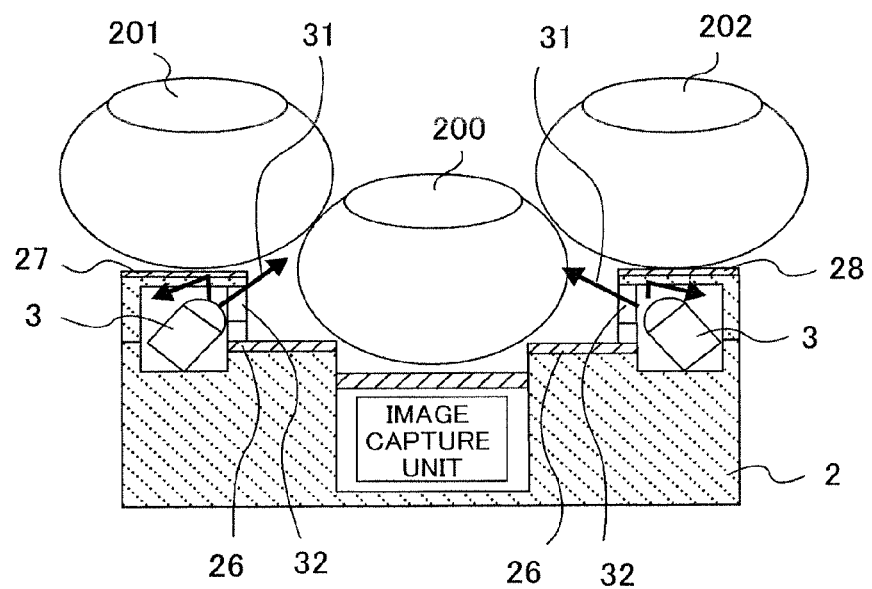

The finger vein data acquisition device 2 of the present embodiment achieves both a thin profile device and high image quality by a downward irradiation method where a light source 3 installed at a low position on the left and right sides of the finger as shown in FIG. 3A irradiates light diagonally upward. However in devices using a simple downward left/right irradiation method, when the fingers 201, 202 that are not authentication fingers have neared the center finger 200, then the light source 3 will become blocked by the finger 201 and finger 202 (FIG. 3B). When the light source 3 is blocked, light cannot irradiate onto the authentication finger 200 so performing authentication is impossible. Moreover, even if the light source 3 is not completely blocked, the light output from the light source 3 is reflected from the surfaces of the left and right fingers 201, 202 sometimes causing a change in the direction the light advances as shown in FIG. 3C. A sharp vein image cannot then be captured because the light path has greatly deviated from the essential irradiation direction. The authentication accuracy therefore deteriorates. Enhancing the image quality in the left/right downward irradiation method requires a structure capable of preventing adverse effects from the left and right fingers. One method considered to prevent these adverse effects utilizes a side wall installed between the center finger 200 and the left/right fingers 201, 202, and does not allow placement of the left/right fingers 201, 202 near the center finger 200. However, completely preventing the left and right fingers from nearing the center requires making the height of the side walls the same height or higher than the finger, and causes the problem that the device must be made larger.

Whereupon, the present embodiment resolves the above problem by using a device structure (FIG. 3D) such as given below. First of all, the left and right finger stands 27 and 28 are made from light-blocking material. The left and right finger stands 27 and 28 are also installed between the light source 3 and the fingers not for authentication. The light 31 is in this way prevented from irradiating onto the left and right fingers 201, 202. The left and right finger stands 27 and 28 in other words, simultaneously function not only as finger stands but also as light blocking walls. Among the light output from the light source 3, the light advancing upward is in this way blocked by the finger stands 27, 28. Therefore no light reflects from the surfaces of the left and right fingers 201, 202 so image quality deterioration can be prevented.

The left and right finger stands 27, 28 are moreover installed at a position somewhat higher than the center finger stand 26. There is also a gap 32 between the center finger stand 26 and the left and right finger stands 27, 28. Among light irradiated from the light source, the light proceeding towards the center finger, irradiates on the authentication finger 200 by way of the gap 32. Only the center finger 200 serving as the object for authentication can be placed on the center finger stand so the gap 32 is not blocked by the left and right fingers 201, 202. The light 31 is therefore not blocked by the left and right fingers so the light reliably irradiates just onto the center finger.

Figure 16A:
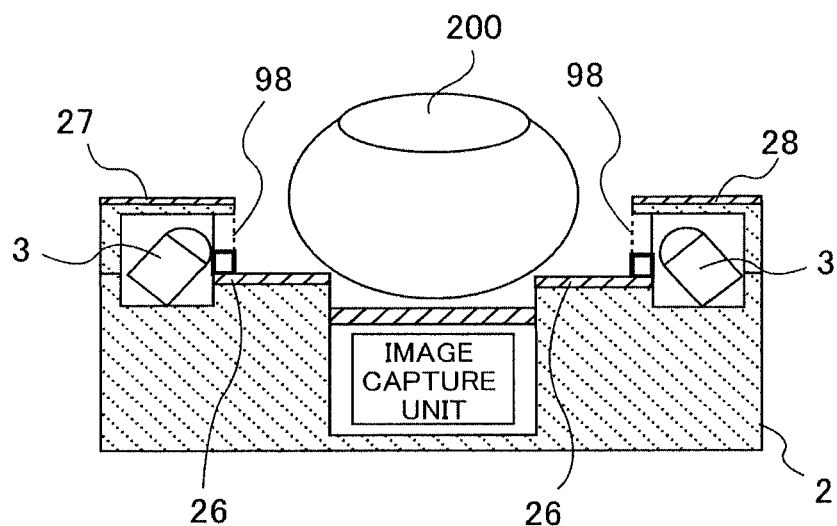
FIGS. 16A and 16B are drawings showing another specific example of the finger vein data acquisition device contour of the first embodiment.
Figure 16B:
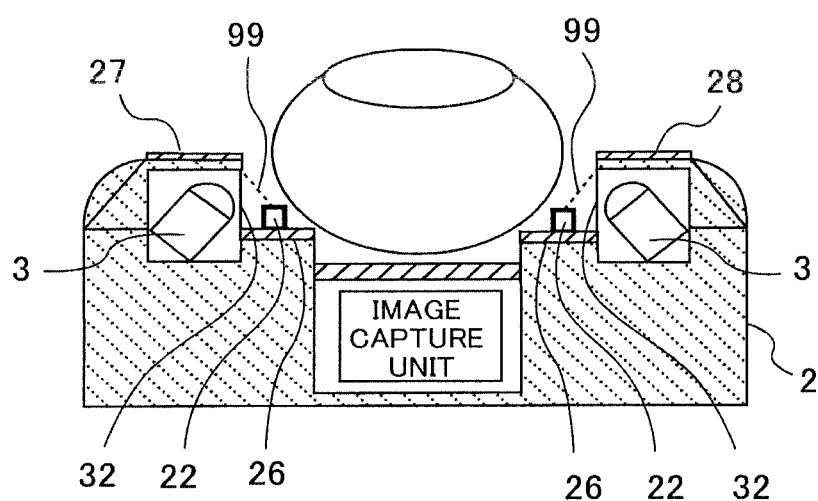

The gap 32 for the left and right finger stands 27, 28 may be covered by a material such as the acrylic plate 98 that allows infrared light to pass through as shown in FIG. 16A. Foreign objects can in this way be prevented from intruding into the device. A light blocking wall 22 is installed on the inner side as shown in FIG. 4B, and an acrylic plate 99 in a V shape (open at the bottom) may also be installed. The finger stands 27, 28 shape consisting of the oblique surface shown by light blocking wall 22 and dotted lines of the V shaped (open at bottom) acrylic plate 99 in this way easily matches the rounded finger 200 shape, and the finger can be mounted in a stable manner. The acrylic plate 99 is formed in a V shape (open at the bottom) so that a space capable of accommodating even stubby fingers can be secured, and the light source 3 installation position brought closer to the inner side. The installation surface area (footprint) of the device can in this way also be reduced. Moreover bringing the light source closer to the finger reduces electrical power consumption because the light is applied more efficiently.

Figure 4A:
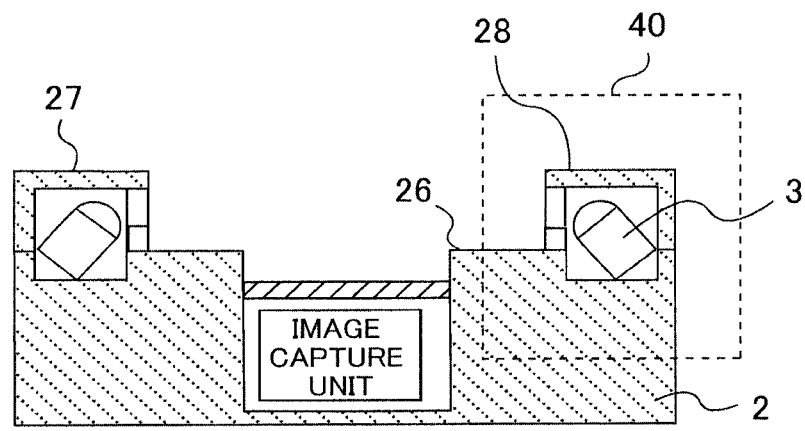
FIGS. 4A and 4B are drawings showing a specific example of the left and right finger stand in the first embodiment.
Figure 4B:
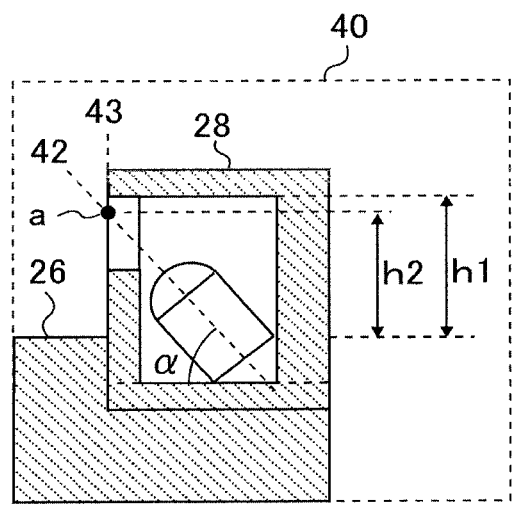

The height of the left and right finger stands 27, 28 in this embodiment are described here while referring to FIGS. 4A and 4B. FIG. 4B is an enlarged drawing of the light source 3 section and the right finger stand 28 of the finger vein data acquisition device 2 in FIG. 4A. Here, the h1 in FIG. 4B indicates the height of the lower surface of the right finger stand 28 based on the center finger stand 26. The line 42 indicates the irradiation axis of light source 3. The line 43 is the line perpendicularly drawn from the left end of the finger stand 28 to the center finger stand 26. The point a is the intersection of line 42 with line 43; and h2 indicates the height of point a based on the center finger stand 26.

As shown in FIG. 4B, the height of the left and right finger stands 27, 28 must be a height that does not block light towards the center finger 200. In other words, the height of left and right finger stands 27, 28 must satisfy the value h1>h2. Light towards the left and right fingers can in this way be blocked, and a sufficient light intensity can be obtained towards the center finger 200. However, when the height h1 of the left and right finger stands 27, 28 is too high, then adverse effects occur such as that the device must be made larger, the difference relative to the center finger stand becomes too large making the finger difficult to mount, and the center finger moves upward by the pull from the left and right finger. Due to these adverse effects, h1 should be shortened as much as possible in a range allowing adequate light intensity on the center finger. More specifically, the step difference between the center finger stand 26 and the left and right finger stands 27, 28 should preferably be limited to 10 millimeters or less.

Figure 5A:
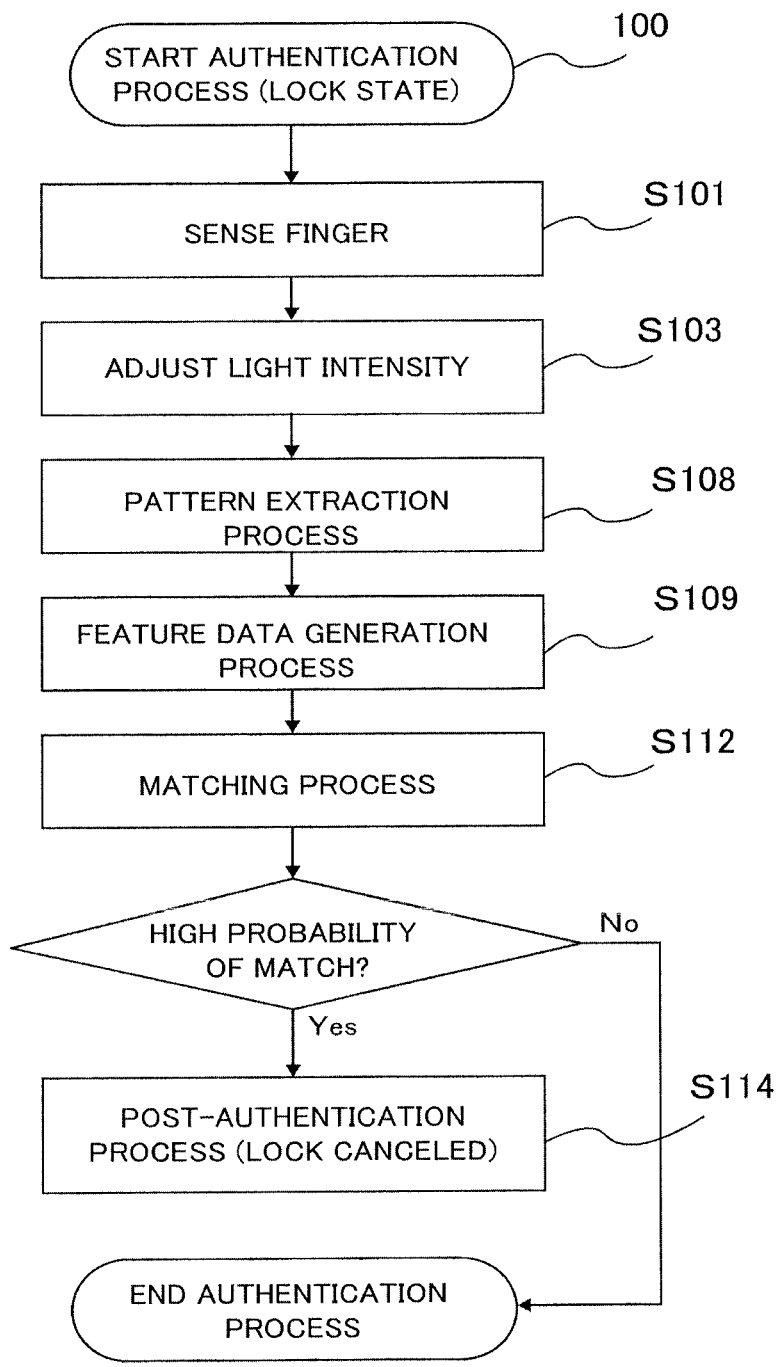
FIGS. 5A and 5B are flow charts for describing the authentication process implemented by the authentication program in the first embodiment.

An example of the processing sequence of the first embodiment in which the CPU 11 executes the authentication program 100 is described next while referring to FIG. 5A. A decision is first of all made in the sense finger process (S101) on whether or not a finger was placed on the device. If a finger was placed, then the light control (S103) is implemented in order to irradiate a suitable light intensity from the light source. Restated in other words, the CPU 11 functions not only as a processor unit for the feature extraction means and feature matching means but also a light intensity control means. After completing the light intensity adjustment, the feature extraction (S108) and the feature data generation process (S109) are executed. The feature data is then matched in the feature matching (S112) with the pre-registered feature data, and a decision made on whether there is registered data. The main flow is described next in detail.

In order to find the timing at which to start authentication, a decision is first of all made whether or not the finger was placed on the device (S101). This decision method can utilize a method using the touch sensor 23 installed on the finger stand 26, or an image processing method, or a method combining a touch sensor with image processing, etc. An example of the method using image processing is described here. The method using image processing offers the advantage that the number of parts can be reduced since no finger detection sensor is needed. The light source 3 already described as utilized for the lighting for the finger vein pattern image is first of all flashed on and off for a specified period. If nothing has been placed on the device, then regardless of whether the light source 3 is lit up or is off there is no object to scatter the light so the light from the light source 3 cannot be captured by the image capture unit 4. There is therefore no large change in luminance values between when the light source 3 is lit up (on state) and the light source 3 is off (off state) when the images from image unit 4 are compared. However when the finger 200 is placed on the device, then the light emitted from the light source 3 is scattered by the finger 200 and loaded into the image capture unit 4. A large difference in luminance values therefore occurs between the image when the light source 3 is in the lit up (on) state and the image when in the off state. This change quantity is sent to the authentication processor unit 10 by way of the image input unit 18, calculated in the CPU 11, and then retained in order to sense that the finger is mounted.

The light intensity for the lighting is output from the light source 3 when the placing of the finger is detected. The light intensity required for capturing the vein image will vary according to the thickness of the skin and the finger size, etc. The light intensity of light source 3 is then adjusted to obtain the sharpest image (S103). A sharp image of the finger veins can be obtained when the average luminance value of the captured image is a value near the center of the luminance scale. For example, when the average luminance of the image is too low, then the image is not sharp because the contrast between the blood vessels and all other areas is poor. Conversely, if the average luminance is too high, then saturation will occur in sections so the blood vessels cannot be extracted. In other words, in the adjust light intensity S103, a target luminance value is set as the center value on the luminance scale, and the light intensity is adjusted so that the average luminance value of the captured image is near the target value. The light intensity adjustment technique utilized in this embodiment is a method that constantly monitors the average luminance value of the image, and utilizes that value in feedback control of the light intensity to attain a value close to the target luminance value.

Figure 5B:
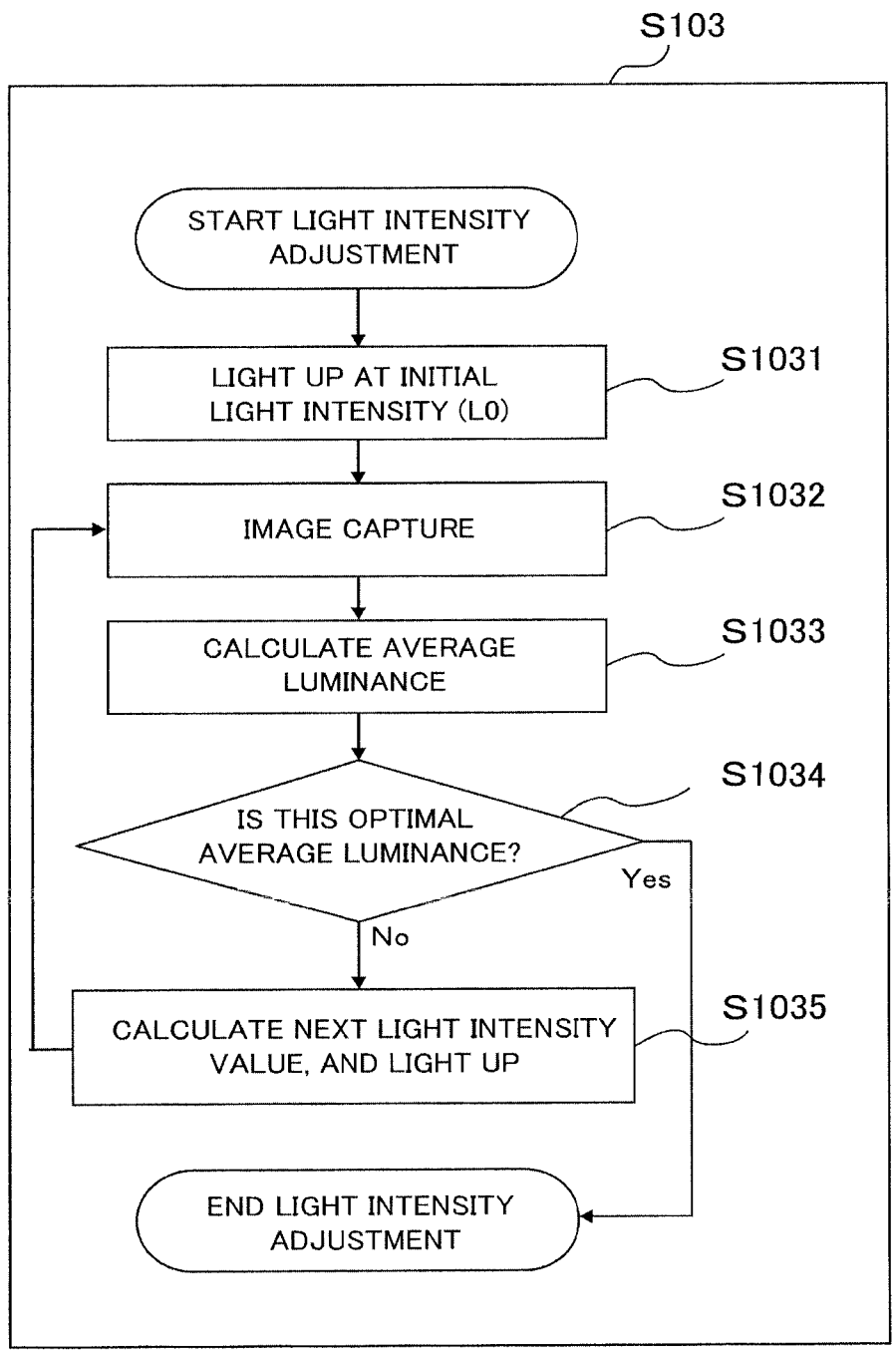

FIG. 5B is a flowchart showing that technique. In this technique, the light source 3 is made to light up at a preset initial light intensity value L0, immediately after the placement of the finger is detected (S1031). The initial light intensity value L0 is a light intensity value that is measured and set in advance from an image captured at the target luminance value when a standard finger is placed on the device. The image is next captured by the image capture unit 4 (S1032). The average luminance value V0 for this image is then calculated (S1033). A decision is then made whether this calculated average luminance value V0 is the target luminance value (S1034). When this target luminance value is not reached then the next light intensity value is reset (S1035). The calculation of the next light intensity is made by utilizing the feature that there is a proportional relation between the light intensity value and the average luminance value of the captured image. After resetting the light intensity value, the image capture process (S1032), the calculate average luminance process (S1033), and the average luminance value decision process (S1034) are executed. This flow is repeated to obtain a result near the target luminance value. If decided in S1034 that the average luminance value reached the target luminance value then the light adjustment is complete.

The blood vessel feature extraction is next implemented (S108). This technique may utilize a method using a matched filter and an edge enhancement filter for enhancing the line segments; a method for extracting line patterns by tracking the line components, and a method for extracting the localized dip positions of the luminance value in the image cross sectional profile, etc.

After the above process, the feature data are then generated from the extracted results (in the feature data generation process) (S109). The feature data can be utilized in a method for setting the image for the feature extraction process results itself as the feature quantity, and a method for detecting the end points and branch points, etc. If using the image itself as the feature quantity, then a reduction process may be applied to the image after feature extraction in order to reduce the data size.

Finally, the generated feature data is matched with the feature data made and registered by the same method in advance (S112). When using the image itself as feature data, the images are overlapped, and mutual pixel values compared to calculate the matching rate. If using the branch points and end points at the feature data, then information such as the position, count (quantity), branch line angle and relative distances are compared to calculate the match rate. The match rate obtained in this way, is used to decide if a pattern is the same pattern or a different pattern. The threshold value utilized for this decision may be calculated statistically in advance. If the match rate is higher than the threshold value then the person submitting the finger is judged as registered, and if lower than the threshold value then the person submitting the finger is judged as not registered and authentication is refused.

If the device judges the person submitting the finger as registered, then the lock is for example released as the post-authentication process (S114).

Figure 10A:
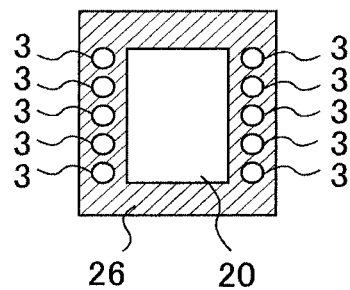
FIGS. 10A, 10B, 10C, 10D, and 10E are drawings showing specific examples of the light source installation method in the first embodiment.
Figure 10B:
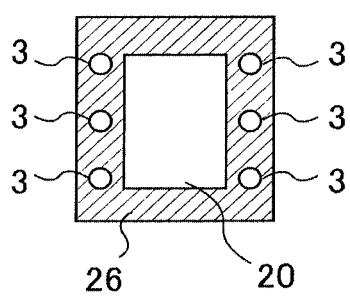
Figure 10C:
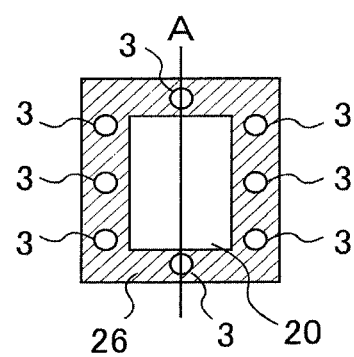

FIGS. 10A to 10E are drawings showing an example of the placement of the light source 3 made up of multiple light source devices for capturing an image with minimal luminance variations. FIG. 10A through FIG. 10C are drawings viewed from the upper side of the finger vein acquisition device 2.

In the feature extraction (S108) for finger vein authentication, the luminance values for each pixel in the image are investigated, and a vein is judged to be present if that pixel luminance is lower than the surrounding pixels and the pixel is extracted. So in order to make high accuracy authentications, irradiating a uniform light intensity onto the entire finger, and capturing images with minimal luminance variations is essential. If the light being irradiated is uneven, then only a portion of the area will be captured as a dark shadow so when image processing is performed, that area will be mistakenly extracted as a blood vessel.

The light sources are therefore positioned so as to reduce these luminance variations. The light sources 3 may be positioned one each on the left and right if the finger can be irradiated at an adequate brightness. However, in order to suppress variations in luminance, multiple light source devices are preferably arranged longitudinally as shown in FIG. 10A and FIG. 10B. In this case, the gap between the light source devices arrayed respectively on the left and right sides is made uniform. This arrangement allows irradiating from the fingertip side to the to finger base side at a uniform brightness. A sufficient amount of light might sometimes not reach from the fingertip to the finger base with the light sources arrayed only on the left and right sides of the finger so the light sources 3 may also be installed on the fingertip and finger base side as shown in FIG. 10C to supplement the light irradiation. FIG. 10E is a side view taken along the straight line A of FIG. 10C. The light sources 3 on the fingertip side and finger bases side are installed facing the upper side as shown in FIG. 10E. Installing the light sources tilted somewhat in the direction away from the aperture at this time will prevent direct light from penetrating into the aperture.

Separately controlling the light intensity from these light sources in light control (S103) is effective. The ideal light intensity value will vary according to the finger size and skin thickness of the user as already described. Even on the same finger, the width and thickness will also vary on the fingertip side and finger base side so that the suitable amount of light will be different. The light intensity values on the fingertip side and finger base side may therefore each be controlled separately, or features where the finger width is as narrow as the fingertip and as thick as the finger base utilized, and the light intensity adjusted beforehand so that the light intensity is strong on the fingertip side, and the light intensities on the fingertip side and finger base side are simultaneously controlled. Also, when irradiating the same light intensity is unavoidable, then the light source position may be placed close to the fingertip, and may be placed farther from the finger base side. Moreover, the light intensity values on the left and right may be separately controlled in view of the asymmetrical finger shape and left/right position deviations when the finger is mounted.

Figure 10D:
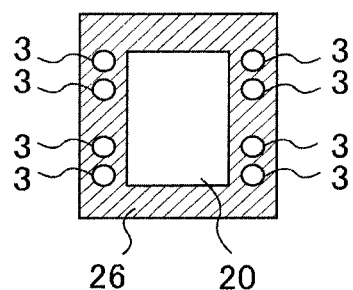
Figure 10E:
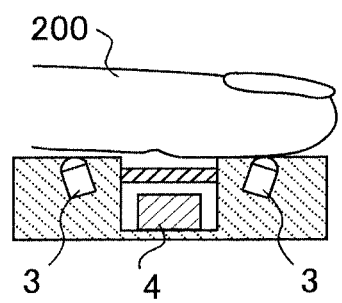

When positioning multiple light sources 3, instead of the placing all the light sources 3 at completely equal spacing, the light source spacing near the center as shown in FIG. 10D may be arranged somewhat wider than the spacing between the fingertip and finger base side. In this embodiment, the imaging is performed with the first joint placed in the center of the aperture 20 as already described. The skin of the first joint is thin so that image capture of the veins can be performed at a lower light intensity than in other sections. The light sources 3 can therefore be installed closer to the fingertip side and finger base side as shown in FIG. 10D, and the first joint position avoided. Strong light will in this way strike sections other than the first joint, and a somewhat weak light will strike the first joint. The light intensity will therefore be uniform across the entire image.

When six light sources are installed, three each on the left and right as shown in FIG. 10B, then the six LED are each controlled separately. In this embodiment, an image of the veins is captured in the area centered on the first joint whose skin is thin. The skin on the fingertip side is thicker than the first joint so that capturing a somewhat stronger light intensity than in the vicinity of the first joint is necessary on the fingertip side in order to capture a sharp image of the vein. The finger base side requires stronger light, even when the finger base side is compared with the first joint section. Therefore, when three light sources each are placed on the left and the right sides as in FIG. 10B, separately controlling the fingertip side, the finger base side, and the first joint section allows irradiating the most suitable light intensity on each section, and obtains a sharp image of the veins over the entire range of the captured image.

Second Embodiment

In the second embodiment, the registration data that is registered in one authentication device is limited to one case, or in other words, the authentication device performs a one-to-one authentication (1 registered person: 1 registration data). The process is described next using the case where the authentication device is built for example into a locker. This type of device cannot be used simultaneously by more than one person. In the case of a public locker for example, the information is registered when locking the locker and no one except the registered party can utilize the locker until the next time the locker is opened. The authentication device in other words stores only the registration data of the last registered user, and authenticates only one registration data case.

The light control S103 of the first embodiment is improved in the second embodiment and the S103 processing time is shortened. These changes allow using an inexpensive CPU with a slower processing speed, and lower the cost of the device itself. The power consumption is also reduced so the device can also be operated by battery.

The processing time in the adjustment light intensity process S103 of the first embodiment greatly increases when the calculate next light intensity setting (S1035) and image capture (S1032) have repeated several times without reaching the target average luminance value. The relation between the light intensity value and average luminance value for the captured image becomes nonlinear particularly when the captured image is too bright and saturates, or when the image is too dark so that predicting a correct light intensity value becomes difficult when calculating the light intensity for the next image capture (S1035). The second embodiment resolves these problems and shortens the processing time in the adjustment light intensity process S103.

Figure 6B:
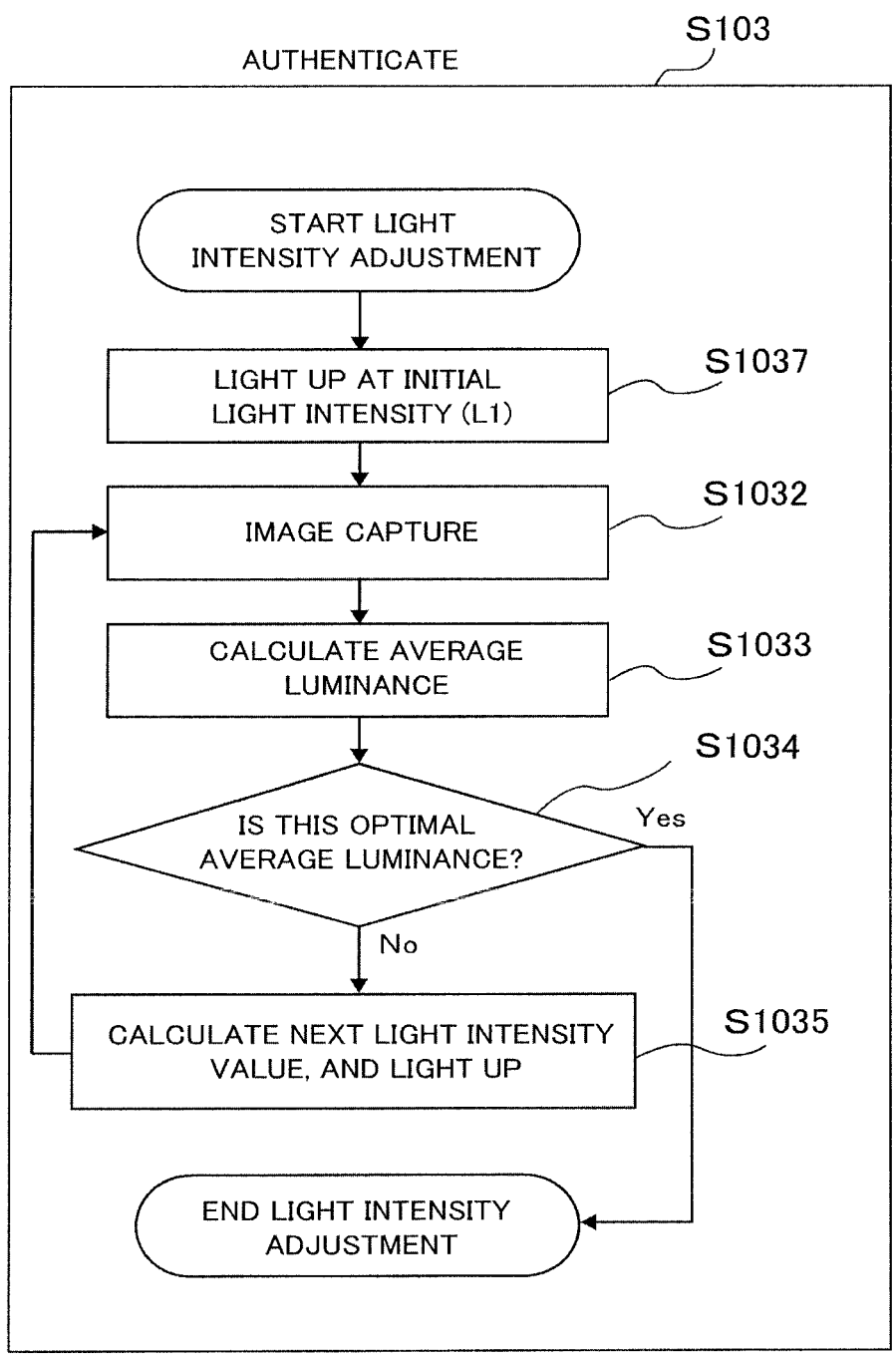

FIGS. 6A and 6B are flowcharts for the light control S103 in the second embodiment. FIG. 6A shows the flow during the registration process. FIG. 6B shows the flow during the authentication process.

The light intensity adjustment process during registration is described first. The light intensity during registration is adjusted in the processing from S1031 to S1035 the same as during light adjustment in the first embodiment, by monitoring the average luminance value of the image and controlling the light intensity by feedback using that value, to adjust to the target luminance value. When the average luminance value is reached, the light intensity value L1 is stored in the storage device 14 prior to completing the light adjustment process (S1036).

The light intensity adjustment process during authentication is described next. The light intensity value L1 stored during registration is loaded from the storage device 14 and stored in the memory area 12 simultaneous with the start of the authentication process. The loaded light intensity value L1 that serves as the initial light intensity is made to light up (S1037) the light source. Next, adjustment towards the target average luminance value is made by the processing from S1032 to S1035 the same as in the first embodiment. In this technique, the light intensity value L1 that reached the target luminance value during registration is utilized as the initial light intensity so that if the same finger is used during registration and during authentication then there is a high probability that the target average luminance value will be reached at the first average luminance judgment (S1034). The light intensity adjustment can therefore be completed immediately. Moreover, even in the case that the target average luminance value cannot be reached with light intensity value L1 due to factors such as the finger position, then the image seldom saturates or becomes extremely dark so that the light intensity value serving as the target value is easy to estimate, and the light intensity adjustment can be immediately completed.

When storing light intensity values during registration, the respective light intensity values for each light source may be stored separately, or an average value for multiple light sources may be stored. In the method for irradiating downwards from left and right, when the mounted finger 200 is tilted to either the left or right, then the light intensity value will tend to be small on the side nearer to the finger, and will tend to be large at the position far from the finger. If the light intensity values for the left and right light sources are averaged and these values are stored, then variations in the light intensity values due to the finger 200 position deviating to the left or right can be suppressed so that the light intensity adjustment can be completed in a short time even in cases where there was a deviation in the finger during registration or during authentication. Moreover, the quantity of data that must be stored can be reduced by storing these averaged values.

The case where authentication was performed on a one-to-one basis (1 registered person: 1 registration data) was described in this embodiment. This high-speed method allows registering data for N number of different fingers in an authentication system that makes authentications on a 1-to-N basis. In the registration processing for 1:N authentications, the same processing from S1031 to S1036 is implemented as in the above method for 1:1 authentications, and the ideal light intensity value for each finger is stored. The average value Ln for N number of stored ideal light intensity values is next calculated. The average value Ln for the ideal light intensity serving as the initial light intensity is utilized to light up the light source in initial light intensity process (S1037) during authentication. An ideal initial light intensity value for N number of registered data can in this way be utilized to light up the light source. The authentication process time can be shortened by customizing the initial light intensity values based on the data registered in the device. An average value for the initial light intensity value as in the above example may be utilized, or a mode value may be utilized.

Third Embodiment

Figure 7A:
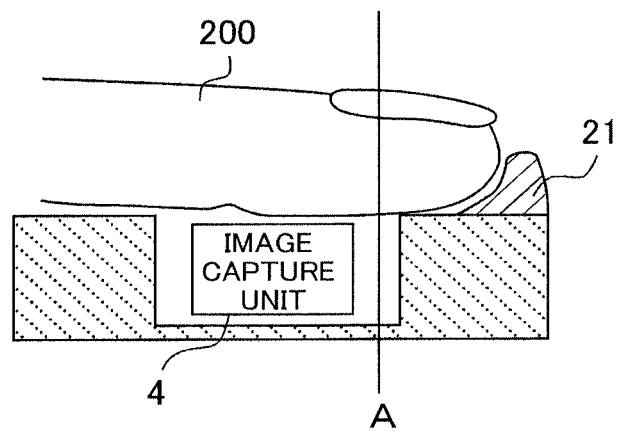
FIGS. 7A, 7B, 7C, 7D, 7E, and 7F are drawings showing a specific example of the device for judging finger placement in the third embodiment.
Figure 7B:
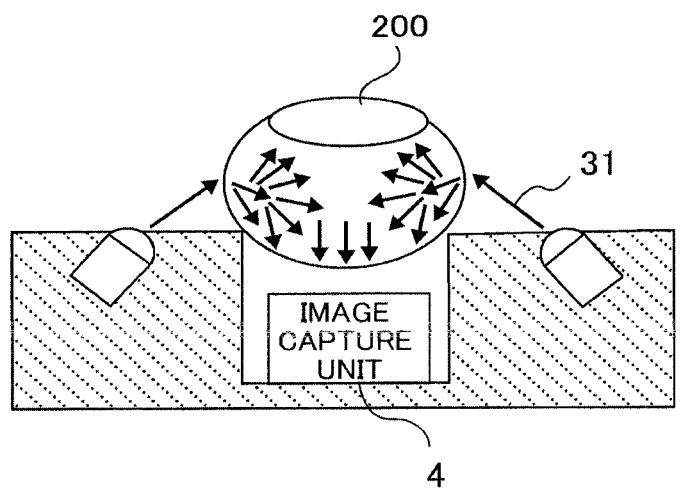
Figure 7C:
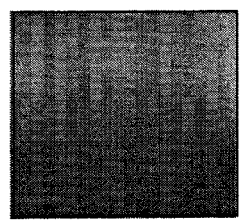
Figure 7D:
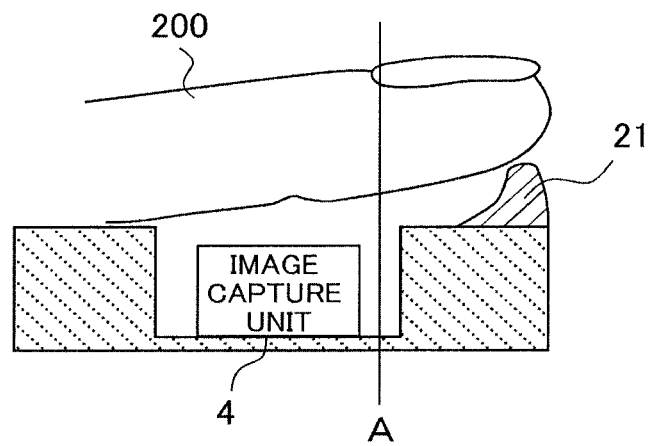
Figure 7E:
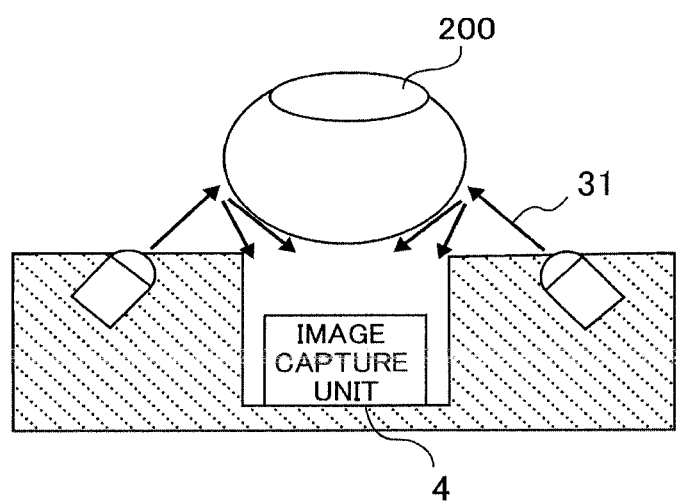
Figure 7F:
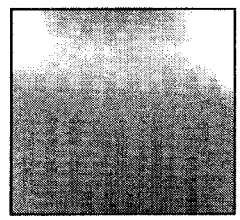

The third embodiment is an authentication system including a function to check that the user finger is correctly placed. The following description is made using FIGS. 7A to 7F. FIG. 7A is a drawing showing the state where the finger 200 is correctly placed. FIG. 7B is a cross sectional view taken along straight line A in FIG. 7A. FIG. 7D and FIG. 7E are drawings showing the state where the finger 200 is not correctly placed. FIG. 7C and FIG. 7F are drawings showing examples of images captured by the image capture unit 4.

The authentication device of this embodiment includes a projection 21 for setting the fingertip position. The user mounts the fingertip aligning it with the position of the projection 21 as shown in FIG. 7A. The finger can in this way be mounted at the same position during registration and during authentication to make highly accurate authentication possible. However a user that is not accustomed to using the device might sometimes mistakenly mount the finger at a position farther inward than the finger stand (finger is driven upwards) as shown in FIG. 7D. The position is not aligned on the fingertip side when the finger has been mounted mistakenly as show in FIG. 7D so the finger mounting position tends to easily deviate during registration and during authentication so even if the user might sometimes not be authenticated even if the user is the genuine (registered) individual. Moreover, light that should essentially be irradiated towards a high position on the side of the finger is instead irradiated towards the underbody of the finger. The image that is captured therefore includes much of the light reflected from the finger surfaces and a sharp blood vessel image cannot be obtained. Therefore registering finger vein patterns in a state where the finger stand is not used correctly will cause drop in authentication accuracy.

Figure 8:
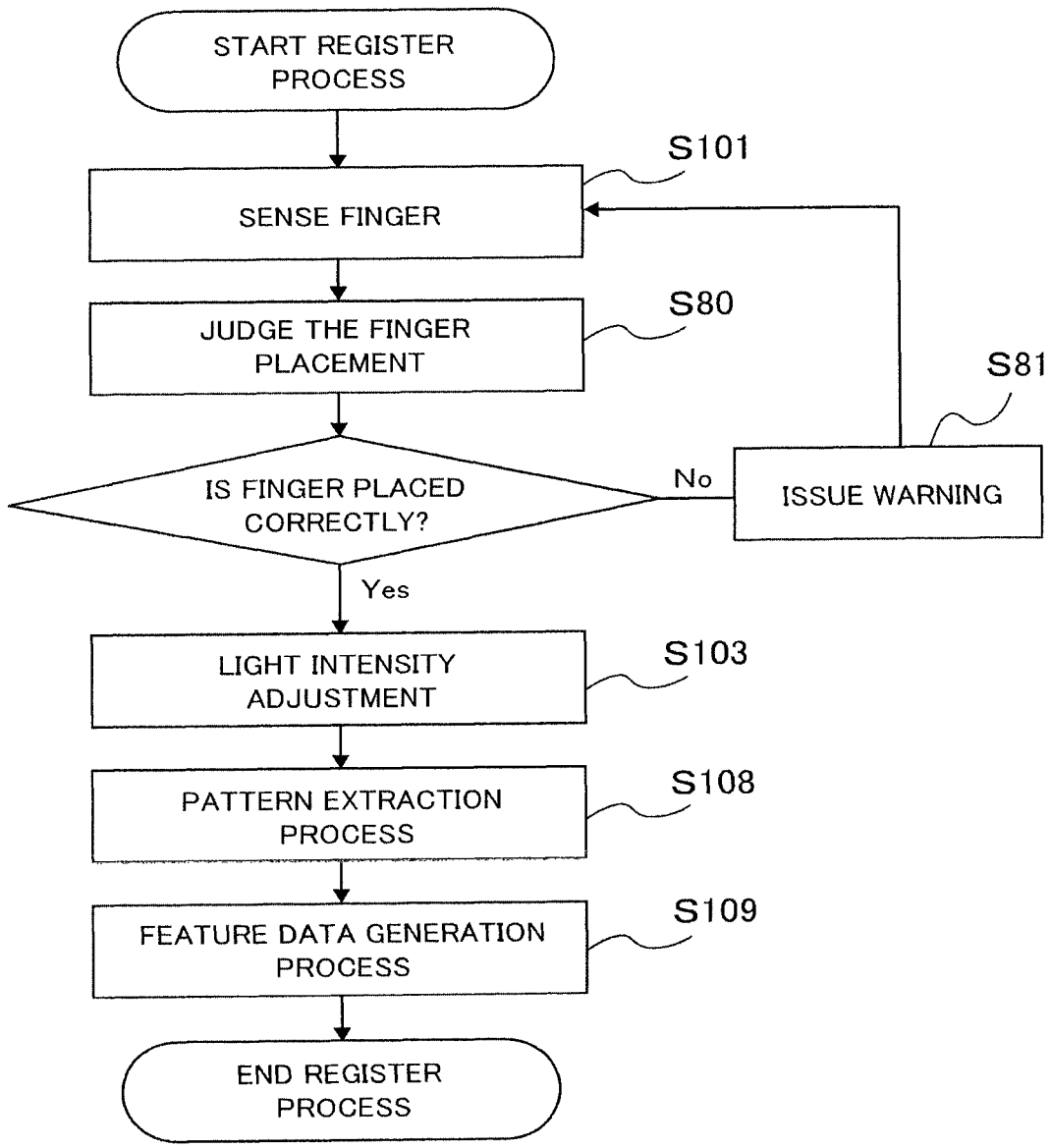
FIG. 8 is a flowchart for showing an example of the finger placement judgment process based on the captured image in the first embodiment.

Whereupon the third embodiment prevents registration during placement errors by judging the user finger placement during registration and outputting a warning to the user when the finger is not correctly placed. Other than the process flow during registration, this embodiment is identical to the first embodiment. FIG. 8 shows the process flow during registration in the third embodiment. The sense finger process (S101) is first implemented, and after the finger is mounted, the judge finger placement process (S80) is implemented. If the finger is placed correctly, then the adjust light intensity (S103), pattern extraction (S108) and feature data generation (S109) processes are implemented and the registration is complete. If the finger is not placed correctly, then a warning is output to the user (S82), and the processing returns once again to the sense finger process (S101). The warning is conveyed to the user by utilizing the display unit 17 or the audio output unit 6. The sense finger process (S101), the judge finger placement process (S80), and the warning (S81) are repeated until the user places the finger correctly.

The judge finger placement process (S80) is implemented in the following procedure. The light source 3 as already described, is first of all lit up at a fixed light intensity value. As already described, transmitted light is image captured when the placement is correct, and reflected light is image captured when the placement is wrong. If the light transmits through the finger then the light will scatter within the finger and just a portion of that light proceeding downwards will be captured by the image capture unit 4. The luminance value is therefore low in the image (FIG. 7C) captured by the image capture unit 4. However when the light reflects from the finger surfaces, the image capture unit 4 captures most of the light output from the light source 3. The luminance value is therefore high in the image (FIG. 7F) captured by the image capture unit 4. The difference in luminance values can be utilized to judge whether the finger is placed correctly. When multiple light sources 3 were placed as in the light source placement shown in FIGS. 10A to 10E, all of the light source in the device 2 may be lit up to judge the finger placement, or just the light source at the fingertip side may be used. The fingertip position becomes higher than the finger base as shown in FIG. 7D when the finger is driven upwards so that lighting up only the light source on the fingertip side will cause a drastic difference in the image due to the different finger placement.

Figure 9:
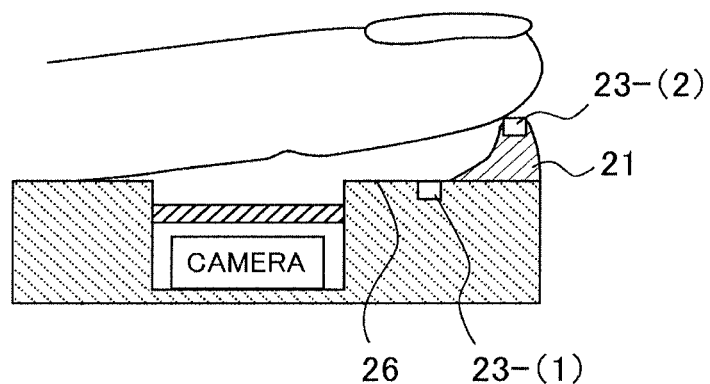
FIG. 9 is a drawing showing one example of the device for judging finger placement based on the touch sensor in the first embodiment.

Methods to detect if the finger was driven upwards include a method utilizing the touch sensor 23. The touch sensors 23-(1) and 23-(2) are respectively installed on the upper side of the projection 21, and the finger stand 26 as shown in FIG. 9. If the finger is mounted correctly then the touch sensor 23-(1) on the finger stand turns ON, and the touch sensor 23-(2) on the projection turns OFF. However if the finger has been driven upward then, the touch sensor 23-(1) turns OFF, and the touch sensor 23-(2) turns ON. Identifying the touch sensor state in this way allows detecting the whether the finger has been correctly placed or not.

Fourth Embodiment

Figure 11:
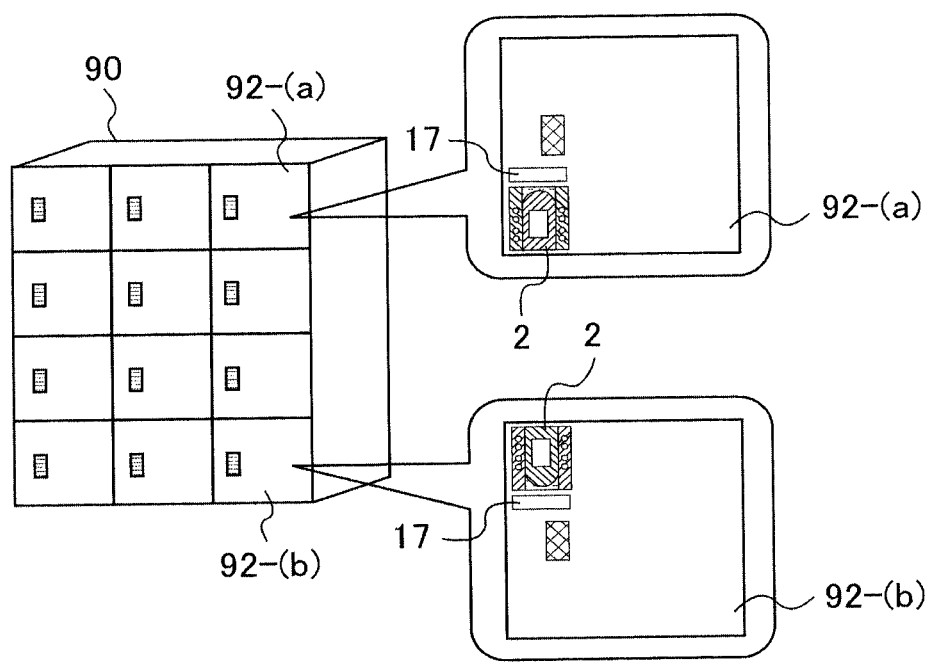
FIG. 11 is a drawing showing a specific example of the locker built into the compact finger vein authentication device of the fourth embodiment.

FIG. 11 is drawings for describing the compact finger vein authentication device described above when built into a locker in the fourth embodiment.

Methods for building the authentication device into a locker 90 include a central control type that controls multiple doors with one authentication device; and a separate control type in which authentication devices are built into each door. Of these two types, in the separate control type, the locking and unlocking are carried out in front of each door so the separate control type is more convenient than the central control type where locking and unlocking are carried out at a position away from the door being used. Moreover, since every door in the separate control type has an authentication device, the separate control type also offers the advantage that there is no waiting time when several users are utilizing the lockers. The authentication device of this invention is sufficiently small to fit into a locker door and so can also be utilized as the separate control type. The description given in the fourth embodiment utilizes the separate control type.

The device 2 of this embodiment is installed on the surface of the locker door 92 as shown in FIG. 11. When installed in a door 92-(*a*) at a high position, the device 2 is installed so that the fingertip faces upwards, and when the authentication device is installed in a door 92-(*b*) at a low position, the device is installed so that the fingertip faces downwards. The finger can in this way mounted in a natural position regardless of the height of the locker. If the device is installed so the fingertip must face upwards on a low door, then the user would have to lower his body position during authentication which would prove inconvenient. Changing the finger placement on upper side doors and lower side doors in this way is effective since the user is not likely to forget at what locker door level the user's baggage is located. Moreover, building the device into the lower side of doors at a high level, and building the device into the upper side of doors at a low level will prove even more convenient.

Figure 15A:
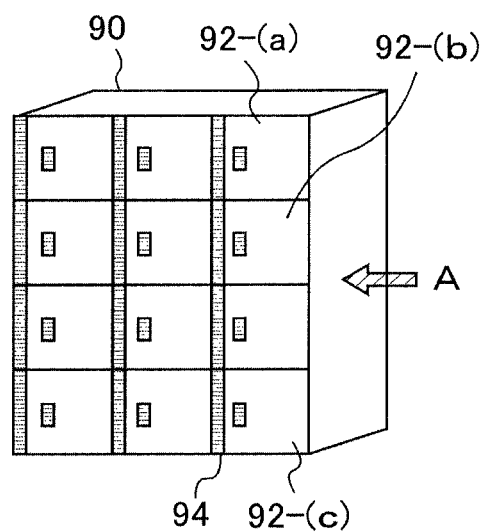
FIGS. 15A, 15B, 15C, and 15D are drawings showing another example of the locker built into the compact finger vein authentication device of the fourth embodiment.
Figure 15B:
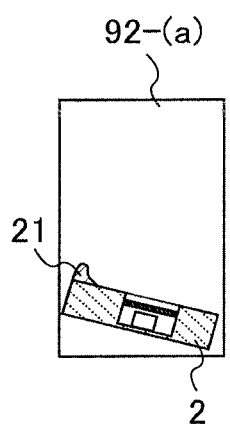
Figure 15C:
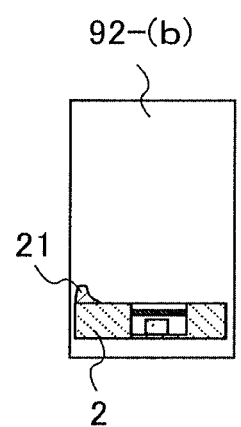
Figure 15D:
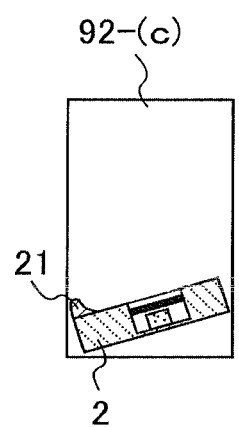

When building the authentication device into a locker, the device may be installed so it is placed in a nearly level state as shown in FIGS. 15A to 15D. A locker for the separate control type is shown in FIG. 15A. FIG. 15B, FIG. 15C and FIG. 15D are drawings respectively showing the high position door 92-(*a*), the mid position door 92-(*b*), and the low position door 92-(*c*) as seen from the A direction in FIG. 15A. If installing in a door at approximately the same height as the user's shoulder then the authentication device 2 should be installed at a level position as shown in FIG. 15C. If installing in a high door, then the authentication device should be installed so that fingertip mounting position is tilted upward somewhat high as shown in FIG. 15B. Conversely, if installing in a low door, then the device should be installed so the fingertip mounting position is tilted downward. These types of installations make it easy for the user to mount his finger. In the above example the device 2 was built into the door of a locker. However the installation location is not limited to only doors and may for example be mounted in the space 94 between the locker boxes.

The authentication device starts when the user places his baggage in the locker 90 and closes the door and the registration process then begins. The user mounts his finger just as in the procedure of the first embodiment to perform the registration process. After registration is complete the locker then locks. To open the locker, the authentication process is carried out, and if judged the same finger as the registered pattern then the door unlocks.

During the registration and authentication, the device guides the user by utilizing the speaker and display unit 17 installed in the door 92 of the locker. The authentication device and display unit 17 are installed as close together as possible when using the display unit 17 such as a liquid crystal monitor as the guide method. If the display unit 17 and the device 2 are installed at positions separated from each other then the user will have to look alternately at the display unit 17 and device 2 during authentication which will prove inconvenient. Some users might only view the display unit 17 and mount their finger while relying only on the touch sensation without visually checking the position of projection 21 on the device 2. Setting the finger position while relying only on the touch sensation will cause poor reproducibility in the finger mount position. The display unit 17 and device 2 should therefore be installed as close to each other as possible so they can be simultaneously viewed by the user.

When using a finger vein authentication device 2 with a small image capture area such as disclosed in Japanese Patent Application Laid-Open Publication No. 2008-181570, the authentication accuracy can be improved by capturing multiple vein images during registration, and retaining multiple registration patterns. The present embodiment also utilizes a technique for improving authentication accuracy in the same way by retaining multiple registration patterns. However this technique imposes a burden on the user by capturing multiple image captures during registration.

The present embodiment therefore alleviates the burden on the user while capturing multiple registration patterns using two techniques.

A technique for alleviating the mental burden on the user by devising guidance for the user is first of all described. More specifically, a display called, "Register" is shown for other than the last registered captured image among N number of registered captured images, and image capture and storage of the registered images is performed. Next, a guide message, "Checking authentication will be correct" is displayed during image capture of the final registration data. The image is then captured and feature data generated, and a pattern matching used to check if authentication will be correct. The user can in this way feel that the registration task will be completed with one less number of image captures. This arrangement decreases the actual time sensed by the user during registration, and lower the mental burden on the user. During capture in particular of two (frame) image patterns, the user is made to feel that the registration completes in just one registration cycle so that the mental burden on the user can be effectively alleviated.

The technique for reducing the burden on the user by reusing a registration pattern is described next.

The usual locker is utilized by a large, unspecified number of users so accumulating the registration data of all the users is impossible. Moreover, one locker door 90 can be simultaneously used by only one user. Therefore one method was considered for the process flow in the authentication system in a repetitive process where registration is performed when locking the locker; and that registration pattern is then discarded when the locker is opened.

However, this method must redo the registration process whenever the locker is locked, even if the same person is continually utilizing the same locker. When using N number of registration techniques in particular, then N number of registration images must be captured each time the locker is utilized. This method therefore increases the burden on the user. Whereupon, when the same person is continuously using the locker, the burden on the user can be lessened by reutilizing the registration data 220.

The process sequence when reutilizing the registration data 220 is described next. In this technique, the registration data is not discarded even after authentication is successful, and while still holding that registration data the device transitions to a state awaiting registration of the next user. When the next user is carrying out the registration procedure, a judgment is made whether this user is the same person as the previous registered person. More specifically, a first image of the user is first of all captured. Next, the registration data 220 on the previous registered person stored in the storage device 14 is matched with the registered pattern generated from the first captured image of the current user. Results from this matching are used to decide whether or not the current user is the previous user. When results from the matching reveal consecutive usage by the same user, then the previous registered data is reutilized as the current registration data, and the registration process ends. If the results reveal another user, then the previous registration data is deleted from the storage device 14. The second and third registration images and so on are then captured up to the required number of images, and after capturing N number of images, the registration data is generated, saved, and the registration process is then complete.

By reutilizing the registration images in this way, multiple registration images can be obtained by capturing just the first registration image. So when consecutively utilized by the same person two or more times, the registration process can be completed from the second time onwards, at the stage where one registration image was captured.

Long term storage of the registration patterns in the storage device 14 even after usage by the user can pose a potential problem in terms of security. Therefore, after a specified amount of time has elapsed after last usage by the user, the device decides that the locker is not being used consecutively, and deletes the registration data 220 from the storage device 14. The safety of this device can in this way be maintained.

The method of this embodiment for alleviating the burden on the user by reutilizing the registration pattern, stored the last one user portion of registration data, to shorten the registration process for that user. However, the number of users and opportunities can be increased to alleviate the burden on the user in the registration process by storing the registration data as long as there is no restriction on the storage device 14, so that for example the registration data for the last three registered users may be stored, to shorten the registration process for those three users.

Fifth Embodiment

Figure 12A:
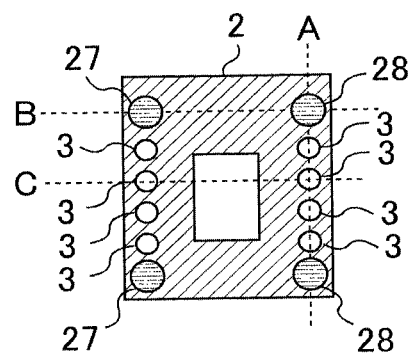
FIGS. 12A, 12B, 12C, 12D, 12E, and 12F are drawings showing a specific example of the left and right finger stand of the fifth embodiment.
Figure 12B:
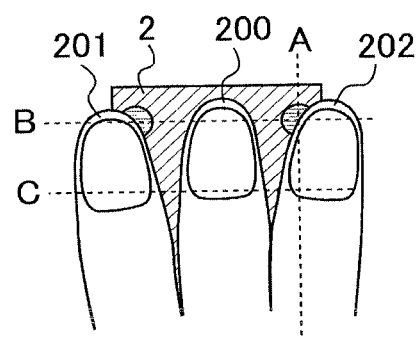
Figure 12C:
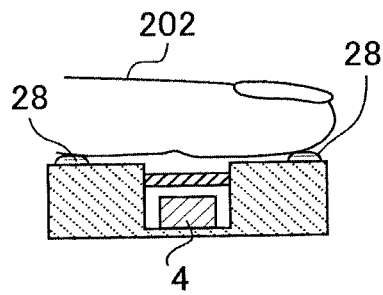
Figure 12D:
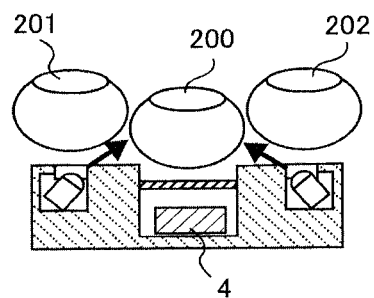
Figure 12E:
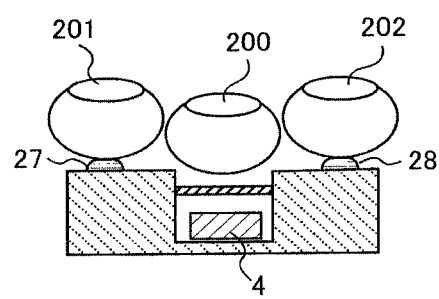
Figure 12F:
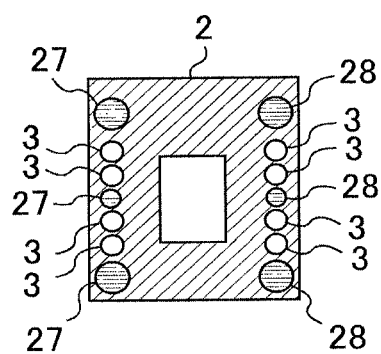

FIGS. 12A and 12F are drawings showing another configuration of the left and right finger stands 27, 28. FIG. 12A and FIG. 12B are upper views of the finger vein data acquisition device 2. FIG. 12C, 12D, and 12E are cross sectional views taken along straight lines A, B, and C in FIG. 12B.

The shape of the left and right finger stands 27, 28 can be simplified when using a highly directional light source whose irradiation direction can be accurately controlled such as the light guide in light source 3. In the device 2 of FIGS. 12A to 12F for example, the left and right finger stands 27, 28 are installed only for supporting the fingertip and finger base of the left and right fingers. The left and right fingers 201, 202 can be maintained at a position higher than the center finger 200 because they are supported at two points consisting of the fingertip and the base. The left and right fingers 201, 202 therefore do not block the light source. Moreover, there is no light proceeding directly upwards above the light source 3 when the light source 3 has high directivity so light does not irradiate onto the palm side surfaces of the left and right fingers, even without blocking the light between the left and right finger stands 27, 28 and the light source 3. A smaller device can therefore be achieved while maintaining image quality equivalent to the device of the first embodiment. If the device is large in the direction of finger length, then the finger supported only at the two points of the fingertip and finger base might be driven upwards, in some cases blocking the light source 3. Whereupon, the left and right finger stands 27, 28 may be installed at positions on the left and right of the aperture to support the left and right fingers 201, 202 at three points as shown in FIG. 12F. This arrangement stabilizes the left and right fingers even further.

Figure 17A:
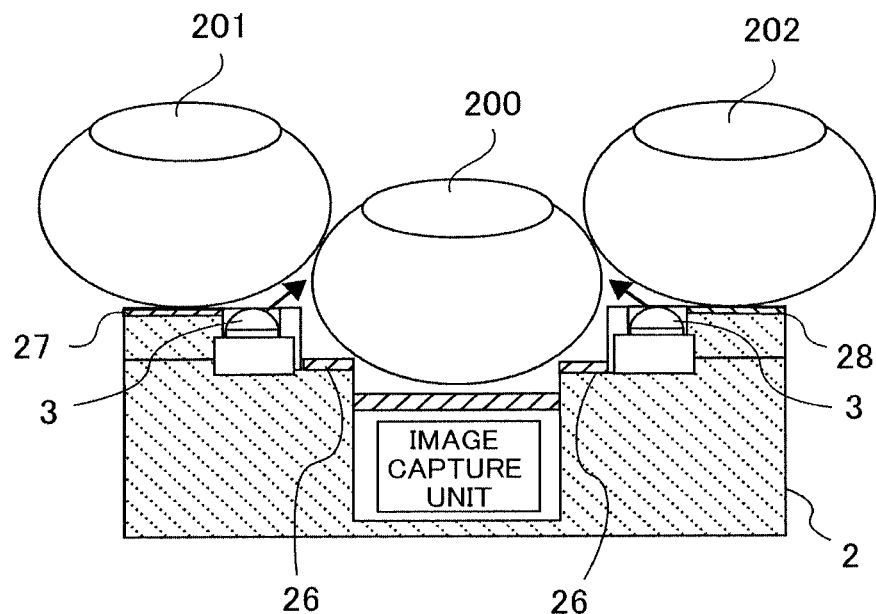
FIGS. 17A and 17B are drawings showing a specific example of the finger vein data acquisition device contour of the fifth embodiment.

Also, if utilizing a highly directional light source, then as shown in FIG. 17A, the installation position of the light source 3 can be raised to approximately the same height as the left and right finger stands 27, 28.

The light source 3 shown in the example in FIG. 17A is a light guide designed to irradiate light only towards the device inner sides, and does not output light towards the outer sides or directly above the light source 3. Therefore, the light source 3 does not irradiate light onto the left and right fingers 201, 202 even if no light blocking member is installed directly above the light source 3. Moreover, the light source 3 is installed close to the inner side to an extent not blocked by the left and right fingers, even if the left and right fingers 201, 202 are close to the center finger 200. There is therefore no deterioration in the vein image quality and no blocking of the light source when the left and right fingers are in proximity.

Figure 17B:
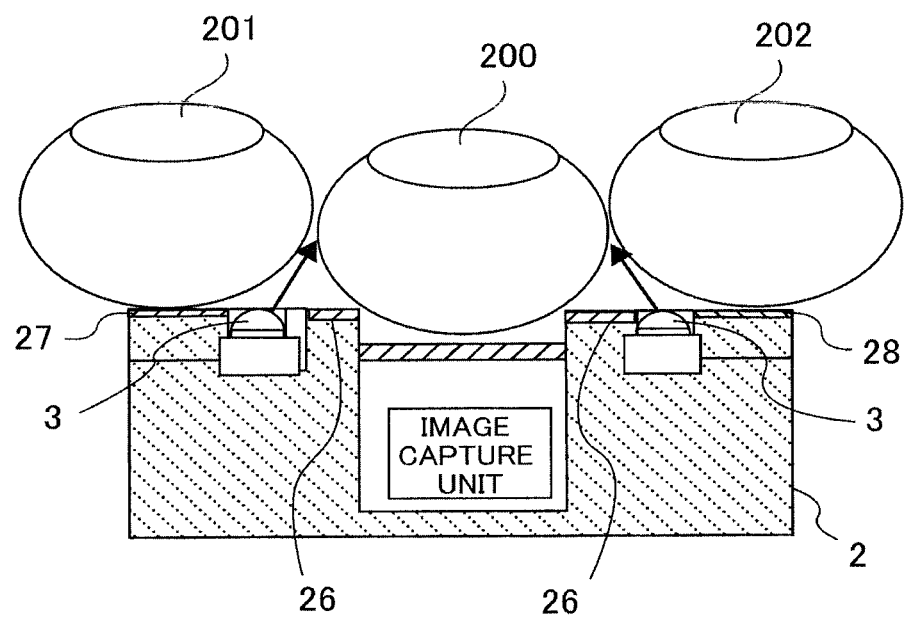

A step is also formed between the center finger stand and the left and right finger stands in the example in FIG. 17A. A space can therefore be secured below the left and right fingers, even when the left and right fingers are close to the center finger. The light output from the light source 3 can therefore be reliably irradiated onto the center finger 200 without being blocked. In a device not formed with a step such as the device in FIG. 17B, the light will always strike the surfaces of the left and right fingers 201, 202 when attempting to irradiate light at the same position as the device of FIG. 17A, so that the image quality will deteriorate.

Sixth Embodiment

Figure 13A:
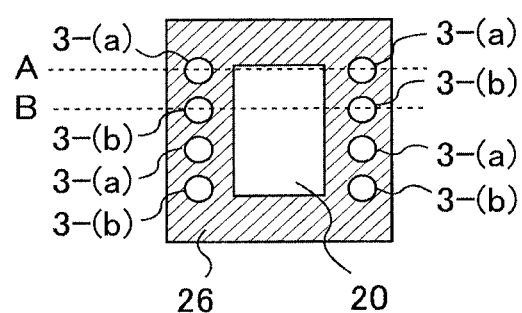
FIGS. 13A, 13B, 13C, and 13D are drawings showing the finger vein data acquisition device including multiple different angled light sources of the sixth embodiment.
Figure 13B:
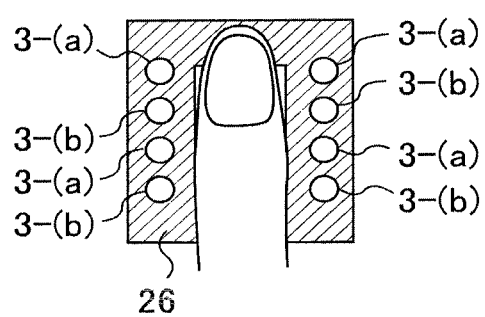
Figure 13C:
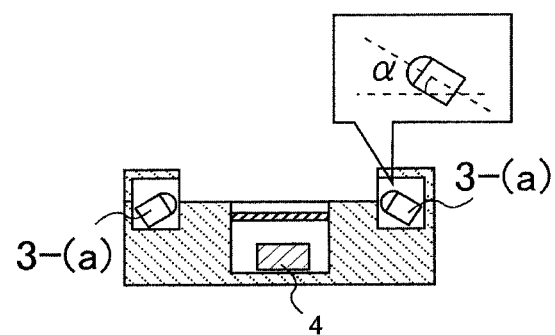
Figure 13D:
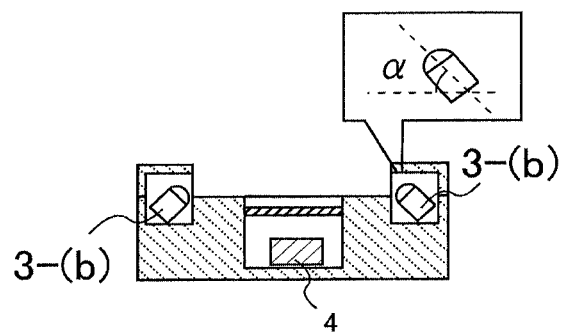

FIGS. 13A to 13D are drawings of an example of the finger vein data acquisition device 2 for that switches the lighting to each finger, and where the light source devices 3-(a) and 3-(b) serving as the light source 3 are installed at two types of angles. FIG. 13A and FIG. 13B are upper views of the device. FIG. 13C and FIG. 13D are cross sectional views taken along line A and line B of FIG. 13A.

The installation angle α of light source device 3-(a) is a small value capable of definitely irradiating light onto even narrow finger. In the light source device 3-(b) on the other hand, the installation angle α is larger than light source device 3-(a) and capable of irradiating light towards a higher position. Only the light source device 3-(a) is used to capture blood vessel images when a narrow finger was mounted, and only the light source device 3-(b) is used when a fat finger was submitted. Light can in this way be irradiated onto each finger at as high a position as possible so that a sharp vein image can be captured.

Figure 14A:
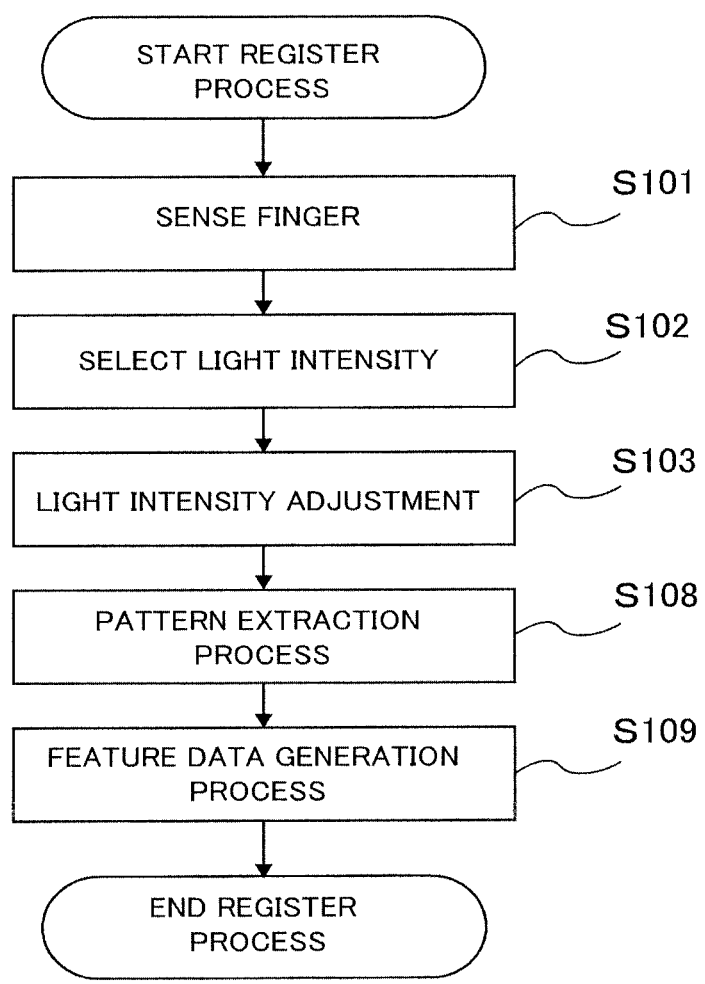
FIGS. 14A and 14B are flow charts for describing the technique for selecting a suitable light source from the multiple light sources to match the mounted finger in the sixth embodiment.
Figure 14B:
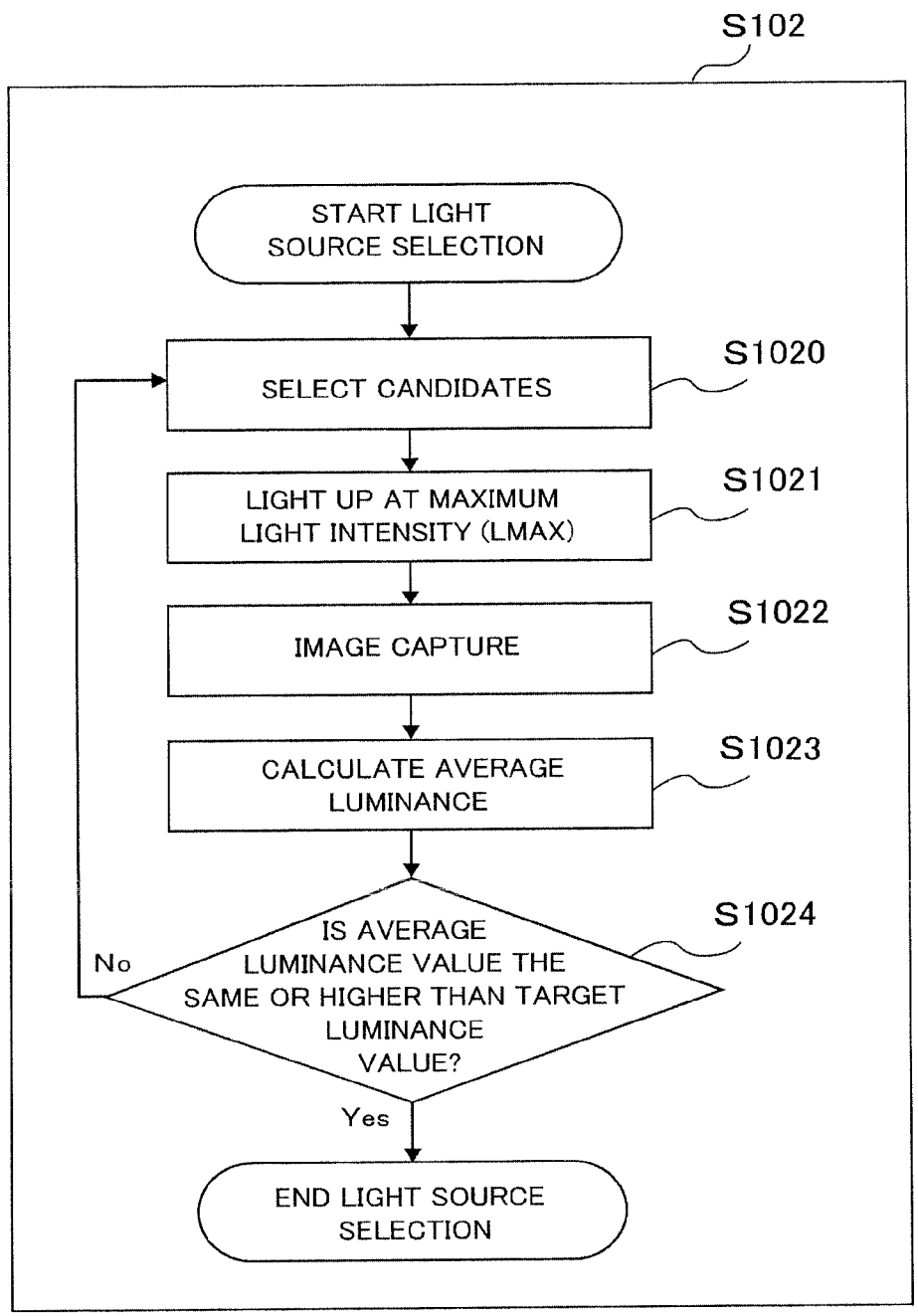

The process flow in the device in FIGS. 13A to 13D is described next while referring to FIG. 14A. When the mounted finger is detected (S101), a suitable light source is selected for that finger (S102). The process flow for selecting the light source is just as shown in FIG. 14B. First, the light source device 3-(b) aiming upwards is selected as a candidate (S1020), and is lit up at the maximum light intensity value (S1021). The image at that time is then captured (S1022), and the average luminance for that image is calculated (S1023). A decision is then made on whether that calculated value is the target luminance value or higher. If that value is the target luminance value or higher then a sufficient amount of light is judged to be striking the mounted finger 200. The light source device 3-(b) is therefore selected and the light source selection process ends. Conversely, if the average luminance was lower than the target value, then the amount of light irradiated on the finger is judged inadequate, or in other words the light is judged to be passing above the finger. The light source is therefore reselected. The light source device 3-(a) is next selected as the candidate, and the process implemented from light source on (S1021) to decide average luminance (S1024) and, if the average luminance is the target luminance value or higher then the light source selection process ends. Turning on the light source in the order of light sources aimed in a high direction in this way allows selecting a light source aimed at as high a position as possible for that finger. After light source selection is complete, the light control (S103) is executed using the selected light source 3, the feature extraction (S108) performed, and the feature data generation process (S109) are executed. After the light source selection, the light intensity value and the selected light source may be stored in the storage device 14, the same as in the high-speed method for the light control (S103) described in the second embodiment. The light intensity selection process is therefore no longer needed during authentication, and authentication can be implemented at high speed and with high accuracy.

The sequence for placing the light sources 3 is light source device 3-(a), light source device 3-(b), light source device 3-(a), and light source device 3-(b) starting from the fingertips. The finger becomes narrower from the base side to the fingertip side so narrower type fingers can also be accommodated by installing a light source device 3-(a) with a small α on the fingertip side.

In this embodiment, light source devices with two types of angles were described. However light source devices capable of attaining the highest image quality may be selected by lighting up the light source starting with the high angle light source device, the same as when using light source devices with three or more types of installation angles.

In the various embodiments described above, the finger vein authentication device was applied to lockers. However the authentication device of this invention may also be applied to mobile equipment such as cellular telephones, personal digital assistants (PDA), personal computers (PC), or vehicles, and entry/exit monitor devices, etc. Moreover, the above described embodiments are only examples, and needless to say, this invention is not limited to the above described embodiments.

What is claimed is:

1. An authentication device comprising:
   a finger presenting unit to which a finger to be authenticated is presented;
   an opening formed on the finger presenting unit;
   a light source that irradiates light onto the finger;
   an image capture unit that captures a picture including a vein of the finger, as illuminated by the light; and
   a finger placement table capable of placing a finger thereon, except the finger to be authenticated;
   wherein the finger placement table is placed higher than the finger presenting unit;
   wherein the finger placement table has a light passing unit in a sidewall thereof, that is used to allow the light from the light source to pass towards a region on which the finger to be authenticated is presented; and
   wherein a height of the finger placement table is higher than a height of an intersection of the light source irradiation axis with an edge of the light passing unit.

2. The authentication device according to claim 1, further comprising:
   a casing;
   wherein the finger presenting unit and the finger placement table are integrated together with the casing.

3. The authentication device according to claim 1, wherein the opening is formed at a position lower than a surface on which the finger to be authenticated is presented.

4. The authentication device according to claim 1, wherein light passing unit is disposed in an upper portion of the sidewall of the finger placement table.

5. An authentication device comprising:
   a finger presenting unit on which a finger to be authenticated is presented;
   a light source that irradiates light onto the finger;
   an image capture unit that captures a picture including a vein of the finger, as illuminated by the light; and
   a finger placement table capable of placing fingers thereon, except the finger to be authenticated;
   wherein the finger placement table is placed higher than the finger presenting unit;
   wherein the finger placement table has a light passing unit in a sidewall thereof, that is used to allow the light from the light source to pass towards a region on which the finger to be authenticated is presented; and
   wherein a height of the finger placement table is higher than a height of an intersection of the light source irradiation axis with an edge of the light passing unit.

6. The authentication device according to claim 5, wherein the finger presenting unit has an opening at a position lower than a surface on which the finger is placed.

7. The authentication device according to claim 5, wherein the finger presenting unit and the finger placement table are integrated together.

8. The authentication device according to claim 5, wherein light passing unit is disposed in an upper portion of the sidewall of the finger placement table.

9. A capture device for capturing a vein of a finger, the device comprising:
- a finger presenting unit to which a finger to be authenticated is presented, and which is formed in a casing;
- a light source that irradiates light onto the finger; and an image capture unit that captures a picture including a vein of the finger, as illuminated by the light;
- wherein the casing is formed by a part protruded from a side of the finger presenting unit;
- wherein the finger placement table is placed higher than the finger present unit;
- wherein the finger placement table has a light passing unit in a sidewall thereof, that is used to allow the light from the light source to pass towards a region on which the finger to be authenticated is presented; and
- wherein a height of the finger placement table is higher than a height of an intersection of the light source irradiation axis with an edge of the light passing unit.

10. The capture device according to claim 9, wherein the finger presenting unit is integrated together with the casing.

11. The capture device according to claim 9, wherein a window which passes the light from the light source is formed in an upper part of sidewall of the protruded part of the casing.

12. The capture device according to claim 9, wherein light passing unit is disposed in an upper portion of the sidewall of the finger placement table.

13. A capture device for capturing a vein of a finger, the device comprising:
- a casing having a presenting area to which a finger to be authenticated is presented;
- a light source that irradiates light onto the finger to be authenticated, being located in a side of the presenting area; and
- an image capture unit that captures a picture including a vein of the finger, as illuminated by the light;
- wherein the finger placement table is placed higher than the finger presenting unit;
- wherein the finger placement table has a light passing unit in a sidewall thereof, that is used to allow the light from the light source to pass towards a region on which the finger to be authenticated is presented; and
- wherein the height of the finger placement table is higher than a height of an intersection of the light source irradiation axis with an edge on the light passing unit.

14. The capture device according to claim 13, wherein a window is formed in a part of the casing, and wherein a light axis of the light source is toward a slanting upper direction.

15. The capture device according to claim 13, wherein the casing has an opening which passes the light transmitted through the finger from the light source, and the opening unit is formed lower than the presenting area.

16. The capture device according to claim 13,
- wherein the light source include a first light source and a second light source, which are placed in a tip side of the finger, and a third light source and a fourth light source, which are placed in a root side of the finger, and
- wherein an angle of the second light source from a placed surface is larger than an angle of the first light source from the placed surface, and an angle of the fourth light source from the placed surface is larger than an angle of the third light source from the placed surface.

17. The capture device according to claim 16, wherein the first light source is placed more in the tip side than the second light source, and the third light source is placed more in the tip side than the fourth light source.

18. The capture device according to claim 16, the device further comprising:
- a light intensity control means for controlling light intensities of the light sources,
- wherein the light intensity control means controls to increase a light amount of the second light source, and
- if brightness of the picture captured by the image capturing unit is lower than a desired value, controls to increase a light amount of the first light source.

19. The capture device according to claim 13, wherein light passing unit is disposed in an upper portion of the sidewall of the finger placement table.

* * * * *